(12) United States Patent
Lalla

(10) Patent No.: US 7,630,844 B2
(45) Date of Patent: *Dec. 8, 2009

(54) FIELD DEVICE ELECTRONICS FED BY AN EXTERNAL ELECTRICAL ENERGY SUPPLY

(75) Inventor: Robert Lalla, Lörrach (DE)

(73) Assignee: Endress + Hauser Flowtec AG, Reinach (CH)

( * ) Notice: Subject to any disclaimer, the term of this patent is extended or adjusted under 35 U.S.C. 154(b) by 26 days.

This patent is subject to a terminal disclaimer.

(21) Appl. No.: 11/822,180

(22) Filed: Jul. 3, 2007

(65) Prior Publication Data

US 2008/0012428 A1    Jan. 17, 2008

Related U.S. Application Data

(60) Provisional application No. 60/818,270, filed on Jul. 5, 2006, provisional application No. 60/818,311, filed on Jul. 5, 2006.

(30) Foreign Application Priority Data

Jul. 3, 2006   (DE)   ........................ 10 2006 030 962
Jul. 3, 2006   (DE)   ........................ 10 2006 030 963

(51) Int. Cl.
  *G01R 27/00*   (2006.01)
(52) U.S. Cl. ........................ 702/65; 324/600; 323/209
(58) Field of Classification Search ................ 702/65; 324/600; 323/209; 312/32, 35, 39
See application file for complete search history.

(56) References Cited

U.S. PATENT DOCUMENTS

| 6,397,322 | B1 | 5/2002 | Voss |
| 7,200,503 | B2 * | 4/2007 | Lalla ........................ 702/65 |
| 2003/0076075 | A1 * | 4/2003 | Ma et al. .................... 323/209 |

FOREIGN PATENT DOCUMENTS

| DE | 41 13 433 A1 | 1/1992 |
| GB | 2 148 559 A | 5/1985 |
| WO | WO 02/103327 A1 | 12/2002 |
| WO | WO 2004/048905 A1 | 6/2004 |
| WO | WO 2006/072541 A2 | 7/2006 |

\* cited by examiner

*Primary Examiner*—Tung S Lau
*Assistant Examiner*—Sujoy K Kundu
(74) *Attorney, Agent, or Firm*—Bacon & Thomas, PLLC

(57) ABSTRACT

Field-device electronics including an electric current adjuster, through which a supply current flows is driven by a supply voltage provided by the external energy supply and adjusted by the current adjuster. Additionally, the field-device electronics includes an internal operating and evaluating circuit for controlling the field device, as well as an internal supply circuit feeding the internal operating and evaluating circuit. Provided in the supply circuit is a first useful-voltage controller flowed-through, by a first component of the supply current and a second useful-voltage controller flowed through, at least at times, by a second current component of the supply current and providing in the field-device electronics a second internal, useful voltage. The second useful voltage controller is fed by the first useful voltage delivered by the first useful voltage controller and/or a secondary voltage drived from the first useful voltage.

48 Claims, 11 Drawing Sheets

FIELD DEVICE ELECTRONICS FED BY AN EXTERNAL ELECTRICAL ENERGY SUPPLY

CROSS-REFERENCES

This application is a non-provisional application of U.S. Provisional application 60/818,270, filed on Jul. 5, 2006 and U.S. Provisional Application 60/818,311 filed on Jul. 5, 2006, and which claims the benefit of German application numbers 10 2006 030963.4 filed on Jul. 3, 2006 and 10 2006 030962.6 filed on Jul. 3, 2006.

It also contains subject matter which is related to the subject matter disclosed in U.S. patent application Ser. No. 11/822,179 filed on Jul. 3, 2007, and to U.S. patent application Ser. No. 11/319,619 filed on Dec. 29, 2005.

FIELD OF THE INVENTION

The invention relates to a field-device electronics for a field device. The field-device electronics is fed by an external electrical energy, or power, supply. The invention relates, as well, to a field device having such a field-device electronics.

BACKGROUND OF THE INVENTION

In the technology of industrial process measurements and automation, especially also in connection with the automation of chemical or technical-method processes and/or the control of industrial plants, measuring devices installed near to the process, so-called field devices, are used for locally producing measured-value signals as analog or digital representations of process variables. Likewise, field devices can be embodied as adjusting devices for varying one or more of such process variables and, in such respect, actively guiding the flow of the process. Such process variables to be registered, or adjusted, as the case may be, include, for example, and as can also be perceived from the cited state of the art, mass flow rate, density, viscosity, fill level, limit level, pressure, temperature, or the like, of a liquid, powdered, vaporous or gaseous medium, conveyed, or stored, as the case may be, in a corresponding containment, such as e.g. a pipeline or a tank. Additional examples for such field devices, which are known, per se, to those skilled in the art, are described extensively and in detail in WO-A 05/040735, WO-A 04/048905, WO-A 03/048874, WO-A 02/45045, WO-A 02/103327, WO-A 02/086426, WO-A 01/02816, WO-A 00/48157, WO-A 00/36379, WO-A 00/14485, WO-A 95/16897, WO-A 88/02853, WO-A 88/02476, U.S. Pat. No. 7,200,503, U.S. Pat. No. 7,004,191, U.S. Pat. No. 6,932,098, U.S. Pat. No. 6,799,476, U.S. Pat. No. 6,776,053, U.S. Pat. No. 6,769,301, U.S. Pat. No. 6,577,989, U.S. Pat. No. 6,662,120, U.S. Pat. No. 6,574,515, U.S. Pat. No. 6,535,161, U.S. Pat. No. 6,512,358, U.S. Pat. No. 6,487,507, U.S. Pat. No. 6,480,131, U.S. Pat. No. 6,476,522, U.S. Pat. No. 6,397,683, U.S. Pat. No. 6,352,000, U.S. Pat. No. 6,311,136, U.S. Pat. No. 6,285,094, U.S. Pat. No. 6,269,701, U.S. Pat. No. 6,236,322, U.S. Pat. No. 6,140,940, U.S. Pat. No. 6,014,100, U.S. Pat. No. 6,006,609, U.S. Pat. No. 5,959,372, U.S. Pat. No. 5,796,011, U.S. Pat. No. 5,742,225, U.S. Pat. No. 5,687,100, U.S. Pat. No. 5,672,975, U.S. Pat. No. 5,604,685, U.S. Pat. No. 5,535,243, U.S. Pat. No. 5,469,748, U.S. Pat. No. 5,416,723, U.S. Pat. No. 5,363,341, U.S. Pat. No. 5,359,881, U.S. Pat. No. 5,231,884, U.S. Pat. No. 5,207,101, U.S. Pat. No. 5,131,279, U.S. Pat. No. 5,068,592, U.S. Pat. No. 5,065,152, U.S. Pat. No. 5,052,230, U.S. Pat. No. 4,926,340, U.S. Pat. No. 4,850,213, U.S. Pat. No. 4,768,384, U.S. Pat. No. 4,716,770, U.S. Pat. No. 4,656,353, U.S. Pat. No. 4,617,607, U.S. Pat. No. 4,594,584, U.S. Pat. No. 4,574,328, U.S. Pat. No. 4,524,610, U.S. Pat. No. 4,468,971, U.S. Pat. No. 4,317,116, U.S. Pat. No. 4,308,754, U.S. Pat. No. 3,878,725, U.S. Pat. No. 3,764,880, EP-A 1 158 289, EP-A 1 147 463, EP-A 1 058 093, EP-A 984 248, EP-A 591 926, EP-A 525 920, or EP-A 415 655, DE-A 44 12 388 or DE-A 39 34 007. The field devices disclosed therein are, in each case, fed by an external, electrical energy supply, which provides a supply voltage and a supply current driven thereby, flowing through the electronics of the field devices.

For the case in which the field device serves as a measuring device, it additionally contains an appropriate physical-to-electrical, or chemical-to-electrical, measurement pickup, or transducer, for electrically registering the relevant process variables. Such pickup is, most often, inserted in the wall of the containment carrying the medium or into the course of a line, for instance a pipeline, conveying the medium, and serves to produce a measurement signal, especially an electrical measurement signal, representing the primarily registered process variable as accurately as possible. For processing the measurement signal, the measurement pickup is, in turn, connected with the operating and evaluating circuit provided in the field-device electronics and serving especially for a further processing or evaluation of the at least one measurement signal. In a large number of such field devices, the measurement pickup is additionally so actuated by a driving signal generated, at least at times, by the operating and evaluating circuit, that the pickup interacts at least directly with the medium in a manner suitable for the measurement or, alternatively, essentially directly with the medium via an appropriate probe, in order to provoke reactions reflecting the parameter to be registered. The driving signal can, in such case, be controlled, for example with respect to an electrical current level, a voltage level and/or a frequency. Examples of such active measurement pickups, thus measurement pickups appropriately converting an electric driving signal in the medium, are, especially, flow measurement pickups serving for the measurement of media flowing at least at times. The pickups utilize at least one coil actuated by the driving signal to produce a magnetic field, or at least one ultrasound emitter actuated by the driving signal, or a fill level, and/or limit level, pickup serving for measuring and/or monitoring fill levels in a container, such as e.g. microwave antennas, Goubau lines, thus a waveguide for acoustic or electromagnetic surface waves, vibrating immersion elements, or the like.

For accommodating the field-device electronics, field devices of the described kind further include an electronics housing, which, as e.g. disclosed in U.S. Pat. No. 6,397,683 or WO-A 00/36379, can be situated remotely from the field device and connected therewith only via a flexible cable, or which, as shown e.g. also in EP-A 903 651 or EP-A 1 008 836, is arranged directly on the measurement pickup or in, or on, a measurement pickup housing separately housing the measurement pickup. Often, the electronics housing then serves, as shown, for example, in EP-A 984 248, U.S. Pat. No. 4,594,584, U.S. Pat. No. 4,716,770, or U.S. Pat. No. 6,352,000, also to accommodate some mechanical components of the measurement pickup, such as e.g. membrane, rod, shell or tubular, deforming or vibrating members deforming during operation, under the influence of mechanical forces; compare, in this connection, also the above-mentioned U.S. Pat. No. 6,352,000. Field devices of the described kind are, furthermore, usually connected together and/or with appropriate process control computers via a data transmission system connected to the field-device electronics. The field devices transmit their measured value signals to such locations e.g. via (4 mA to 20 mA)-current loops and/or via digital data bus and/or receive operating data and/or control commands in corresponding manner. Serving as data transmission systems here are especially fieldbus systems, such as e.g. PROFIBUS-PA, FOUNDATION fieldbus, as well as the corresponding transmission protocols. By means of the process control computers, the transmitted measured value signals can be processed further and visualized as corresponding measurement results e.g. on monitors and/or converted into control signals for other field devices embodied as actuators, e.g. in the form of solenoid-controlled valves, electric motors, etc.

Furthermore, a large number of field devices of the described kind, especially also measuring field-devices, are electrically so designed that they satisfy the requirements for intrinsic explosion-safety. Accordingly, the field devices are operated with such a low electrical power that, for lack of reaching ignition conditions, sparks or arcs can electrically not be released. Intrinsically safe explosion protection is, for example, given according to the European Standards EN 50 014 and EN 50 020, when electronic apparatuses are so constructed that they satisfy the ignition protection classification "Intrinsic Safety (Ex-i)" defined therein. According to this ignition protection classification, thus electrical currents, voltages and powers occurring in the field device are, at all times, not permitted to exceed specified current, voltage and power, limit values. These three limit values are so selected that, in the case of malfunction, or in the case of a short circuit, the maximally released amount of energy is not sufficient to produce an ignition-capable spark. Usually, in the case of intrinsically safe, field devices, the electrical power is not permitted to exceed 1 W (=watt). The voltage can be kept below the specified limit values e.g. by Z-diodes, the current e.g. by resistors, and the power by appropriate combinations of voltage- and current-limiting components.

In the case of modern field devices, these are often so-called two-wire field devices, thus field devices in the case of which the field-device electronics is electrically connected with the external, electrical energy supply solely via a single pair of electrical lines and in the case of which the field-device electronics also transmits the instantaneous measured value via the single pair of electrical lines to an evaluation unit provided in the external, electrical energy supply and/or electrically coupled therewith. The field-device electronics includes, in such case, always an electrical current controller for setting and/or modulating, especially clocking, such as strobing, triggering or firing, the supply current, an internal operating and evaluating circuit for controlling the field device, as well as an internal supply circuit lying at an internal input voltage of the field-device electronics derived from the supply voltage, feeding the internal operating and evaluating circuit and having at least one useful-voltage controller, e.g. regulator, flowed through by a variable electrical current component of the supply current and providing an internal useful voltage in the field-device electronics which is regulated, or controlled, to be essentially constant at a predeterminable voltage level. Examples of such two-wire field devices, especially two-wire measuring devices or two-wire actuators can be found in, among others, WO-A 05/040735, WO-A 04/048905, WO-A 03/048874, WO-A 02/45045, WO-A 02/103327, WO-A 00/48157, WO-A 00/26739, U.S. Pat. No. 7,200,503, U.S. Pat. No. 6,799,476, U.S. Pat. No. 6,577,989, U.S. Pat. No. 6,662,120, U.S. Pat. No. 6,574,515, U.S. Pat. No. 6,535,161, U.S. Pat. No. 6,512,358, U.S. Pat. No. 6,480, 131, U.S. Pat. No. 6,311,136, U.S. Pat. No. 6,285,094, U.S. Pat. No. 6,269,701, U.S. Pat. No. 6,140,940, U.S. Pat. No. 6,014,100, U.S. Pat. No. 5,959,372, U.S. Pat. No. 5,742,225, U.S. Pat. No. 5,672,975, U.S. Pat. No. 5,535,243, U.S. Pat. No. 5,416,723, U.S. Pat. No. 5,207,101, U.S. Pat. No. 5,068, 592, U.S. Pat. No. 5,065,152, U.S. Pat. No. 4,926,340, U.S. Pat. No. 4,656,353, U.S. Pat. No. 4,317,116, U.S. Pat. No. 3,764,880, EP-A 1 147 463, EP-A 1 058 093, EP-A 591 926, EP-A 525 920, EP-A 415,655, DE-A 44 12 388, or DE-A 39 34 007. In certain cases, there is provided within the field device electronics, as described, for example, in U.S. Pat. No. 3,764,880 or WO-A 04/048905, also a galvanic separation, for example between the internal operating and evaluating circuit, on the one hand, and the current controller, on the other hand, in order to prevent that possible potential differences, which are not always avoidable with certainty, between the plant, into which the field device is installed, and the external, electrical energy supply, are dropped uncontrolled.

For historical reasons, such two-wire field devices are, for the most part, so designed that a supply current instantaneously flowing in the single-pair line in the form of a current loop at an instantaneous electrical current level set at a value lying between 4 mA and 20 mA (=milliamperes), at the same time, also represents the measured value produced by the field device at that instant, or the actuating value instantaneously being sent to the field device, as the case may be. As a result of this, a special problem of such two-wire field devices is that the electric power at least nominally dissipatable or to be dissipated by the field-device electronics—in the following referenced in short as "available power"—can fluctuate during operation in practically unpredictable manner over a wide range. To accommodate this, modern two-wire field devices (2L, or two line, field devices), especially modern two-wire measuring devices (2L measuring devices) with (4 mA to 20 mA)-current loops, are, therefore, usually so designed that their device functionality implemented by means of a microcomputer provided in the evaluating and operating circuit is variable, and, to this extent, the operating and evaluating circuit, which, for the most part, does not dissipate much power anyway, can be adapted to the instantaneously available power.

A suitable adapting of the field-device electronics to the available power can e.g., as also proposed in U.S. Pat. No. 6,799,476, U.S. Pat. No. 6,512,358, or U.S. Pat. No. 5,416, 723, be achieved by matching the power instantaneously dissipated in the field device to the instantaneously available power, and, indeed, in a manner such that individual functional units of the operating and evaluating circuit are operated with appropriately variable clock speeds, or, depending on the level of the instantaneously available power, even turned off for a period of time (ready, or sleep, mode). In the case of field devices embodied as two-wire measuring devices with active measurement pickup, the electric power instantaneously dissipated in the field device can, as disclosed in, among others, U.S. Pat. No. 6,799,476, U.S. Pat. No. 6,014,100, or WO-A 02/103327, additionally be matched to the instantaneously available power by adapting also the electric power instantaneously dissipated in the measurement pickup, for example by clocking of the, as required, buffered driving signal, along with a corresponding matchable strobe rate, with which the driving signal is clocked, and/or by reducing a maximum electrical current level and/or a maximum voltage level of the driving signal.

However, in the case of field devices embodied as two-wire measuring devices, a varying of the device functionality has, for the most part, the result that, during operation, an accuracy, with which the operating and evaluating circuit determines the measured value, and/or a frequency, with which the operating and evaluating circuit, for example, updates the measured value, are/is subject to changes in the instantaneously available power. Also the buffering of excess power present at times can only conditionally remedy this disadvantage of two-wire measuring devices with (4 mA to 20 mA)-current loops. On the one hand, due to the intrinsic explosion safety often required for such two-wire measuring devices, at best, existing excess electrical energy can be stored in only very limited amounts internally in the field-device electronics. On the other hand, however, the instantaneous supply current, and, to such extent, also the, at best, available excess energy, depends only on the instantaneous measured value, so that, in the case of a lastingly very low, but, timewise, strongly varying, measured value, a correspondingly provided energy buffer can, over a longer period of time, become completely discharged. Moreover, for establishing such a complex power management in the field device, a very comprehensive and, thus, also very demanding power measurement is required, both with respect to circuitry and with respect to energy; compare, in this connection, also WO-A 00/26739, U.S. Pat. No. 6,799,476, U.S. Pat. No. 6,512,358, or EP-A 1 174 841

Apart from this, it has been found, in the case of field devices of the described kind having a measurement pickup for the conveying and measuring of media flowing at least at times, that the adaptive clocking of driving signals and/or of individual components of the operating and evaluating circuit is only conditionally suitable. This is true, especially in the application of a vibration-type measurement pickup, such as described, for example, in the above-mentioned U.S. Pat. No. 6,799,476, U.S. Pat. No. 6,691,583, U.S. Pat. No. 6,006,609, U.S. Pat. No. 5,796,011, U.S. Pat. No. 5,687,100, U.S. Pat. No. 5,359,881, U.S. Pat. No. 4,768,384, U.S. Pat. No. 4,524,610, or WO-A 02/103327. The field devices disclosed there serve to measure parameters of media flowing in pipelines, mainly mass flow rate, density or viscosity. To this end, the corresponding measurement pickup will include at least one measuring tube vibrating during operation and serving for the conveying of the medium, an exciter mechanism electrically connected with the field-device electronics and having an oscillation exciter mechanically interacting with the measuring tube for driving the measuring tube, as well as a sensor arrangement, which generates measurement signals by means of at least one oscillation sensor arranged on the measuring tube, for locally representing the measuring tube oscillations. Both the oscillation exciter and the oscillation sensor are, in such case, preferably of the electrodynamic type, thus constructed of a magnet coil and a plunging armature interacting therewith via a magnetic field.

Due to the highly accurate amplitude and frequency control of the exciter mechanism driving signal required for the operation of such a measurement pickup, unavoidable, for one thing, is a timewise high-resolution sampling of the measuring tube oscillations. Equally, in the case of measurements made on flowing media, the issued measured value must also itself be updated often. On the other hand, a, most often, very high mechanical time constant of the oscillation system formed by the measurement pickup leads to the fact that, in the case of possible accelerations of the same, especially during non-stationary, transient happenings, a high driving power must be used and/or relatively long settling times assessed. Further studies in this connection have, however, additionally shown that, because of the usually limited storage capacity for electric power, even a buffering of excess energy in the field device scarcely leads to any significant improvement of the signal-to-noise ratio dependent on the amplitude of the measuring tube oscillations. In this respect, even a temporary and partial switching-off of the operating and evaluating circuit is little suited for two-wire measuring devices with active measurement pickup of the described kind, especially for two-wire measuring devices having a vibration-type measurement pickup involving the conveyance of flowing media.

A further possibility for improving the power capability of field devices of the described kind, especially two-wire measuring devices, is, at least in the case of minimal available power, to use as much thereof as possible actually for the implementing of the device functionality, thus to optimize a corresponding efficiency of the field device, at least in the region of small available power. Supply circuits for the internal supply of the field electronics built on this principle are discussed in detail, for example, in U.S. Pat. No. 6,577,989, or U.S. Pat. No. 6,140,940. Especially, the solutions proposed therein aim to optimize the internally actually dissipatable, electrical power. For this purpose, provided at the input of the field-device electronics, for adjusting and maintaining the above-mentioned, internal input voltage of the field-device electronics at a predeterminable, as required also adjustable, voltage level, is an input voltage controller with a voltage adjuster, which acts at the input of the field device electronics and which, as a function of the instantaneously available power and an instantaneously actually needed power, has flowing through it, at least at times, a variable electrical current component branched from the supply current. However, a disadvantage of this field-device electronics is that all internal consumers are supplied practically from one and the same internal useful voltage and a possible collapse of this single useful voltage, for instance because of too little supply current, can lead to a state in which normal operation of the field device is no longer possible, or even to an abrupt, temporary, total stoppage of the field-device electronics.

SUMMARY OF THE INVENTION

Starting from the above-discussed disadvantages of the state of the art, as viewed on the basis of the given examples of conventional 2L-measuring devices, an object of the invention is to provide, for a field device of the described kind, a suitable field-device electronics, which makes it possible, at least in normal operation of the field device, to keep the evaluating and operating circuit, especially a microprocessor provided therein, continuously in operation and, in such case, to supply at least individual, selected, function units, especially the provided microprocessor, always with electric energy in sufficient measure. Additionally, the field device electronics should be so designed that individual assemblies or components can, with least possible technical complexity and in as loss-free and energy-saving manner as possible, be kept effectively galvanically separated from one another. Furthermore, the field device electronics should be so designed that individual assemblies or components can, with comparatively little complexity, be modularly brought together in such a manner that at least the assemblies or components initially provided for the field device electronics can be used for a large number of types of field devices, especially also field devices designed according to principles of diversity.

For achieving such object, the invention provides, for a field device, a field-device electronics fed from an external electrical energy supply providing an, especially unipolar, supply voltage and delivering, driven by such voltage, an, especially unipolar and/or binary, variable supply current. The field-device electronics of the invention includes: A current controller, flowed-through by the supply current, for adjusting and/or modulating, especially clocking, the supply current; an internal operating and evaluating circuit for controlling the field device; as well as an internal supply circuit lying at an internal input voltage of the field-device electronics derived from the supply voltage, and feeding the internal operating and evaluating circuit, the internal supply circuit including

- a first useful-voltage controller flowed-through, at least at times, by an, especially variable, first electrical current component of the supply current and providing in the field-device electronics an internal, first useful voltage essentially constantly controlled at a first, predeterminable, voltage level,
- a second useful-voltage controller flowed-through, at least at times, by an, especially variable, second electrical current component of the supply current and providing in the field-device electronics an internal, second useful voltage variable over a predeterminable voltage range, as well as
- a voltage adjuster flowed-through, at least at times, by an, especially variable, third electrical current component of the supply current and providing for the setting and maintaining of the internal input voltage of the field-device electronics at a predeterminable voltage level, especially a voltage level which can vary during operation.

Moreover, in the case of the field device electronics of the invention, the second useful-voltage controller is fed by the useful voltage delivered by the first useful-voltage controller and/or by a secondary voltage derived therefrom.

Additionally, the invention resides in a field device including the aforementioned field-device electronics. In a first variant of the filed device of the invention, such serves for measuring and/or monitoring at least one, predetermined, physical and/or chemical parameter, especially a flow rate, density, viscosity, fill level, pressure, temperature, pH-value or the like, of a medium, especially a medium conveyed in a pipeline and/or a container, and the field device includes therefor, additionally, a physical-electrical measurement pickup electrically coupled with the field-device electronics, for reacting to changes of the at least one parameter and for issuing, at least at times, at least one measurement signal corresponding with the parameter, especially a variable signal voltage and/or a variable signal current. In a second variant of the field device of the invention, such serves for the adjusting of at least one predetermined physical and/or chemical parameter, especially a flow rate, a density, a viscosity, fill level, pressure, temperature, pH-value or the like, of a medium, especially a medium conveyed in a pipeline and/or container, and the field device includes therefor, additionally, an electrical-to-physical actuator electrically coupled with the field-device electronics and reacting to changes of at least one applied control signal, especially a variable signal voltage and/or a variable signal current, with an adjusting movement of the actuator for influencing the parameter to be adjusted.

In a first embodiment of the invention, it is provided that the first useful-voltage controller and the internal operating and evaluating circuit are galvanically separated from one another. The first useful-voltage controller and the internal operating and evaluating circuit can, in such case, be coupled together, for example, by means of at least one transformer.

In a second embodiment of the invention, it is provided that both useful-voltage controllers are separated galvanically from one another. The two useful-voltage controllers can, in such case, be coupled with one another, for example, by means of at least one transformer.

In a third embodiment of the invention, it is provided that the current adjuster and the second useful-voltage controller are galvanically separated from one another.

In a fourth embodiment of the invention, it is provided that the current adjuster and the internal operating and evaluating circuit are galvanically separated from one another.

In a fifth embodiment of the invention, it is provided that the voltage adjuster and the second useful-voltage controller are galvanically separated from one another.

In a sixth embodiment of the invention, it is provided that the voltage adjuster and the internal operating and evaluating circuit are galvanically separated from one another.

In a seventh embodiment of the invention, it is provided that the operating and evaluating circuit is flowed through, at least at times, both by a first useful current, especially a variable, first useful current, driven by the first useful voltage and also by a second useful current, especially a variable useful current, driven by the second useful voltage.

In an eighth embodiment of the invention, the internal input voltage of the field device electronics and/or the second useful voltage of the field device electronics are/is controlled as a function of an instantaneous voltage level of a terminal voltage divided from the supply voltage and dropping from the input across the field device electronics. In a further development of this embodiment of the invention, the internal input voltage of the field-device electronics is held by means of the voltage adjuster at a predeterminable voltage level, especially an operationally variable voltage level, which is lower than the terminal voltage. The voltage level, at which the internal input voltage is held by means of the voltage adjuster, can be variable, especially step-wise or essentially continuously, during operation.

In a ninth embodiment of the invention, the second useful voltage is controlled as a function of an instantaneous voltage level of the internal input voltage of the field-device electronics and/or as a function of an instantaneous voltage level of a terminal voltage divided from the supply voltage and dropping from the input across the field-device electronics.

In a tenth embodiment of the invention, the second, the second useful voltage is controlled as a function of an instantaneous electrical-current level of at least one of the three electrical-current components. In a further development of this embodiment of the invention, it is provided that the second useful voltage is controlled as a function of the instantaneous electrical-current strength of the third electrical-current component. In another further development of this embodiment of the invention, it is further provided that the second useful voltage is controlled as a function of the instantaneous strength of the second electrical-current component and an instantaneous voltage level of the internal input voltage of the field-device electronics.

In an eleventh embodiment of the invention, the feeding, external energy supply provides a supply voltage having a variable, especially fluctuating, voltage level.

In a twelfth embodiment of the invention, the supply voltage delivered by the external energy supply drives a supply current having a variable electrical-current level, especially an electrical current level fluctuating essentially in a manner not determinable in advance.

In a thirteenth embodiment of the invention, a storage circuit serving for the temporary storage of electrical energy is provided in the operating and evaluating circuit.

In a fourteenth embodiment of the invention, the voltage adjuster contains a component, especially a semiconductor element or the like, serving principally for the dissipation of electrical energy and for getting rid of the heat energy arising in this way.

In a fifteenth embodiment of the invention, at least one microprocessor is provided in the operating and evaluating circuit, with the first useful voltage, or a secondary voltage derived therefrom, serving, at least in part, as an operating voltage of the microprocessor. In a further development of this embodiment of the invention, the first useful-voltage controller and the microprocessor are galvanically separated from one another. In another further development of this embodiment of the invention, the microprocessor is kept galvanically separated from the current adjuster and/or from the voltage adjuster.

In a sixteenth embodiment of the invention, at least one digital signal processor is provided in the operating and evaluating circuit, with the first useful-voltage, or a secondary voltage derived therefrom, serving, as least in part, as an operating voltage of the digital signal processor. In a further development of this embodiment of the invention, the first useful-voltage controller and the digital signal processor are galvanically separated from one another. In another further development of this embodiment of the invention, the digital signal processor is kept galvanically separated from the current adjuster and/or from the voltage adjuster.

In a seventeenth embodiment of the invention, there is provided in the operating and evaluating circuit at least one amplifier, in which at least one of the two useful voltages, or a secondary voltage derived therefrom, serves, at least partially, as operating voltage. In a further development of this embodiment of the invention, it is additionally provided that the first useful-voltage controller and the at least one amplifier are galvanically separated from one another.

In an eighteenth embodiment of the invention, there is provided in the operating and evaluating circuit at least one A/D converter, in which the first useful voltage, or a secondary voltage derived therefrom, serves, at least partially, as operating voltage. In a further development of this embodiment of the invention, it is additionally provided that the first useful voltage controller and the at least one A/D converter are galvanically separated from one another.

In a nineteenth embodiment of the invention, there is provided in the operating and evaluating circuit at least one D/A converter, in which at least one of the two useful voltages, or a secondary voltage derived therefrom, serves, at least partially, as operating voltage. In a further development of this embodiment of the invention, it is further provided that the first useful voltage controller and the at least one D/A converter are galvanically separated from one another.

In a twentieth embodiment of the invention, means are provided in the operating and evaluating circuit for comparing electric voltages dropping in the field-device electronics and/or electric currents flowing in the field-device electronics, with reference values. In a further development of this embodiment of the invention, the operating and evaluating circuit produces an alarm signal signalling an under-supplying of the field-device electronics, at least when the operating and evaluating circuit detects a subceeding, or falling beneath, by the second useful voltage, of a minimum useful voltage limit value predetermined for the second useful voltage and a subceeding, or falling beneath, by the third electrical current component, of a minimum electrical current component limit value predetermined for the third component. In another further development of this embodiment of the invention, the field-device electronics further includes at least one comparator, which compares a sense voltage derived from the third electrical current component of the supply current with an associated reference voltage, and/or a comparator, which compares the second useful voltage with at least one associated reference voltage.

In a twenty-first embodiment of the invention, such further includes sense resistors serving for producing sense voltages essentially proportional to current.

In a twenty-second embodiment of the field-device electronics of the invention, such further includes a measuring and control unit for registering and adjusting voltages dropping in the field-device electronics, especially the second useful voltage, and/or currents flowing in the field-device electronics, especially the second and/or third electrical current components. In a further development of this embodiment of the invention, the measuring and control unit controls the voltage adjuster such that the third electrical current component flows, when the comparator comparing the second useful voltage with at least one associated reference voltage signals an exceeding by the second useful voltage of a maximum useful voltage limit value predetermined for the second useful voltage. In another further development of this embodiment of the invention, the measuring and control unit maintains a voltage difference between the input voltage and the terminal voltage at a predetermined voltage level on the basis of the input voltage and/or the terminal voltage.

In a twenty-third embodiment of the invention, the field device electronics further includes at least one comparator, which compares a sense voltage derived from the third electrical current component of the supply current with an associated reference voltage, with the at least one comparator for the third electrical current component being kept galvanically separated from the second useful-voltage controller and/or from the internal operating and evaluating circuit.

In a twenty-fourth embodiment of the invention, the field device electronics further includes at least one comparator, which compares the second useful voltage with at least one associated reference voltage, with the at least one comparator for the second useful voltage being kept galvanically separated from the second useful-voltage controller and/or from the internal operating and evaluating circuit.

In a twenty-fifth embodiment of the invention, further included is a measuring and control unit for registering and adjusting voltages dropping in the field device electronics, especially the second useful voltage, and/or currents flowing in the field device electronics, especially the second and/or third electrical current component, and the second useful-voltage controller is controlled by the measuring and control unit. To this end, the measuring and control unit delivers, in a further development of the invention, at least at times, for controlling the second useful-voltage controller, a voltage control signal, which represents a voltage level to be set instantaneously for the second useful voltage. In another further development of this embodiment of the invention, it is provided that the measuring and control unit and the second useful-voltage controller are galvanically separated from one another. In such case, the measuring and control unit and the second useful-voltage controller can be coupled to one another for example by means of at least one transformer and/or by means of at least one optocoupler. In another further development of this embodiment of the invention, it is provided that the measuring and control unit and the internal operating and evaluating circuit are galvanically separated from one another. In such case, the measuring and control unit and the internal operating and evaluating circuit can be coupled together for example by means of at least one transformer and/or by means of at least one optocoupler.

In a twenty-sixth embodiment of the invention, the field-device electronics is electrically connected with the external electrical energy supply solely via a single pair of electric lines.

In a first embodiment of the field device of the invention, such communicates via a data transmission system, at least at times, with a control and review unit, with there being provided in the field-device electronics for such purpose additionally a communication circuit controlling the communication via the data transmission system. In a further development of this embodiment of the invention, the first useful voltage, or a secondary voltage derived therefrom, serves, at least partially, as operating voltage for the communication circuit. In another further development of this embodiment of the invention, the current regulator and the communication circuit are galvanically separated from one another.

In a second embodiment of the field device according to the first variant, the operating and evaluating circuit of the field-device electronics produces, at least at times, by means of the at least one measurement signal, a measured value representing instantaneously, especially digitally, the at least one parameter to be measured and/or to be monitored. In a further development of this embodiment of the invention, the current controller adjusts the supply current on the basis of the measured value instantaneously representing the at least one parameter to be measured and/or monitored. In another further development of this embodiment of the invention, the supply current is a changeable direct-current, and the current controller is adapted to modulate the measured value, at least at times, onto an amplitude of the supply current.

In a third embodiment of the field device according to the first variant, the supply current is, at least at times, a clocked current, with the current controller being correspondingly adapted for clocking the supply current.

In a fourth embodiment of the field device according to the first variant, the operating and evaluating circuit includes at least one driver circuit for the measurement pickup, with the second useful voltage, or a secondary voltage derived therefrom, serving, at least partially, as operating voltage in the driver circuit. In a further development of this embodiment of the invention, the driver circuit contains at least one operational amplifier. In another further development of this embodiment of the invention, the driver circuit has at least one D/A converter and/or at least one signal generator for producing the driver signal. According to a next further development of this embodiment of the invention, the measurement pickup has a variable, electrical impedance fed by the driver circuit, especially a magnet coil of variable inductance and/or a measuring capacitor of variable capacitance. Furthermore, it is provided that the electrical impedance of the measurement pickup changes as a function of at least one parameter to be measured and/or to be monitored. Additionally, it is provided that a signal voltage falling across the changing electrical impedance and/or a signal current flowing through the changing electrical impedance serves as measurement signal.

In a fifth embodiment of the field device according to the first variant, the operating and evaluating circuit has at least one A/D converter for the at least one pickup signal, in which the first useful voltage, or a secondary voltage derived therefrom, serves, at least partially, as operating voltage. In a further development of this embodiment of the invention, the operating and evaluating circuit has at least one microcomputer connected with the A/D converter, especially a microcomputer formed by means of a microprocessor and/or a signal processor, for generating the measured value, with the first useful voltage serving, at least partially, as an operating voltage of the microcomputer.

In a sixth embodiment of the field device according to the first variant, the measurement pickup includes at least one measuring tube inserted into the course of a pipeline for conveying the medium, especially a measuring tube vibrating, at least at times, during operation. In a further development of this embodiment of the invention, at least one magnet coil is arranged on the measurement pickup for producing a magnetic field, especially a variable magnetic field. In an embodiment of this further development of the invention, the magnet coil has, during operation of the measurement pickup, at least at times, an exciter current flowing through it, especially an exciter current which is bipolar and/or variable in an electrical current level, for generating the magnetic field. Such exciter current is driven by the second useful voltage, or a secondary voltage derived therefrom. In another embodiment of this further development of the invention, the magnet coil interacts via a magnetic field with a plunging armature, with magnetic field coil and armature being movable relative to one another. In another embodiment of this further development of the invention, the at least one measuring tube of the measurement pickup vibrates, at least at times, during operation, driven by an electromechanical, especially electrodynamic, exciter mechanism formed by means of the magnetic field coil and the plunging armature.

In a further development of the field device according to the first variant, the measurement pickup includes two measuring tubes inserted into the course of the pipeline for conveying the medium and vibrating, at least at times, during operation.

In a seventh embodiment of the field device according to the first variant, the measurement pickup serves for registering at least one parameter, especially a fill level, of a container containing the medium, and includes therefor at least one measuring probe, especially a microwave antenna, a Goubau line, a vibrating immersion element, or the like, protruding into a lumen of the container or at least communicating with the lumen.

In an eighth embodiment of the field device according to the first variant, the field-device electronics is electrically connected with the external electrical energy supply solely via a single pair of electric lines and transmits the measured value, produced, at least at times, for representing instantaneously, especially digitally, the at least one parameter to be measured and/or monitored, via the single pair of electric lines to an evaluating circuit provided in the external electrical energy supply and/or electrically coupled therewith. In a further development of this embodiment of the invention, an instantaneous electrical current level of the supply current, especially an instantaneous electrical current level adjusted to a value lying between 4 mA and 20 mA, represents the instantaneously produced, measured value.

A basic idea of the invention is to divide consumers provided in the field-device electronics—not counting the supply circuit itself—on the one hand, at least into a first group of electric circuits, or consumers, of higher priority and into a second group of electric circuits, or consumers, of lower priority, and, on the other hand, to design the supply circuit so that, in norm al operation of the field device, at least the power, or energy, requirements of the first group of electric circuits is always covered. Moreover, those circuits or components, which mainly serve for storing energy internally in the field device and/or cause electric energy to dissipate out of the field device, can be assigned to a third group of electric consumers, which has current flow through it and thus is supplied with electric energy solely in the case of a sufficient supply of the first and second groups.

To the first group of electric circuits of higher priority are advantageously assigned, among others, the at least one microprocessor provided in the field-device electronics, along with the communication circuits serving for communication with possible, superordinated, control and review units. This has the advantage that the field device can, on the one hand, be kept permanently functioning and, on the other hand, can also at least be kept permanently on-line. Furthermore, for the case in which the field device is a measuring device, also the measuring channel serving for the registering and conditioning of the at least one measurement signal can primarily be assigned to the first group of electric circuits, while possibly present, exciter channels serving mainly for the operation of the electrical-to-physical measurement pickup can be implemented as electric circuits of lower priority. This has, in the case of use of the field-device electronics of the invention in a measuring device having a vibration-type measurement pickup, especially the advantage that practically the entire measuring channel extending from the oscillation sensors through to the microprocessor can be operated with the essentially constantly controlled, first useful voltage and, therefore, can be supplied permanently in normal operation with the required electric power. This has the advantage that, to such extent, the measuring tube oscillations produced during operation can always be sampled at equally high frequency and can also be processed with high resolution. Additionally, even though the exciter channel is operated partly or exclusively with the variable, second useful voltage, the measuring tube can, in normal operation, be excited essentially without any gaps, thus permanently, although, perhaps, with fluctuating oscillation amplitude. The invention is based on, among other things, the discovery that neither temporary shut-down of the microprocessor, nor intermittent operation of, for example, the exciter channel can bring-about significant improvements in the energy balance. Rather, it is a matter of, on the one hand, supplying the components vital for the operation of the field device, and, as required, the communications with energy as permanently and sufficiently as possible, and, on the other hand, in case required, undersupplying or shutting off components which are less essential. Further, it has been found that, especially also in the case of continuously, or at least quasi continuously, measuring field devices, for example Coriolis mass flow measuring devices, it can be far more beneficial to invest the available electrical energy preferentially into the at least one microprocessor, especially the measured value processing and evaluation, as compared, for example, with the exciter mechanism of the sensor system, which is operated, then, only with the remaining, available energy. In this way, it is, it is true, not always possible to achieve an optimal signal-to-noise ratio for the measurement signal; however, the possibly present deficit in the quality of the measurement signal can be removed by the measured value processing and evaluation, as implemented by the still efficiently operating microprocessor.

As a result of the fact that the second useful-voltage controller is fed by the useful voltage delivered by the first useful-voltage controller and/or by a secondary voltage derived therefrom, it is additionally possible, by just a few transformers and, as required, just a few optocouplers, to provide, in very simple and cost-favorable manner, a very effective galvanic separation between individual components or assemblies of the field device electronics. This is especially true, when a galvanic separation is to be created between the aforementioned groups of electrical circuits of different priority and/or the field device electronics is to be modularly constructed.

An additional advantage of such a cascaded interconnecting of the two useful-voltage controllers is, furthermore, also to be seen in the fact that at least the assemblies or components initially provided for the field device electronics can nevertheless be used also for a large number of types of field devices, especially also field devices designed according to principles of diversity. Especially is this use also possible when individual assemblies or components are modularly combined and/or embodied galvanically separated from one another. For example, in this way, an input module formed by means of the initially provided assemblies or components can be kept galvanically separated from a circuit module including at least parts of the evaluating and operating circuit, especially the driver circuit provided therein.

A further advantage of the invention is that the field device, because of the small power required for its operation, can, without more, meet the specifications of the various explosion-protection classes. This makes the field device specially suited also for application in those explosion-endangered areas, wherein only devices of intrinsic safety are allowed. Furthermore, the field device can, in such case, be so embodied, that it can work together with the usual field busses. This can, on the one hand, occur by direct connection to the field bus, e.g. corresponding to the FIELDBUS-protocol (FIELDBUS is a registered mark of the FIELDBUS-FOUNDATION). On the other hand, the working together can occur indirectly by means of a bus-coupler, e.g. corresponding to the so-called HART-protocol (HART is a registered mark of the HART User Group).

BRIEF DESCRIPTION OF THE DRAWINGS

The invention will now be explained in greater detail on the basis of examples of embodiments, as well as on the basis of the drawing. Functionally equal parts are provided in the separate figures with the same reference characters, which, however, are repeated in subsequent figures only when such appears helpful. The figures of the drawing show as follows.

DETAILED DESCRIPTION OF EXEMPLARY EMBODIMENTS

Figure 1:
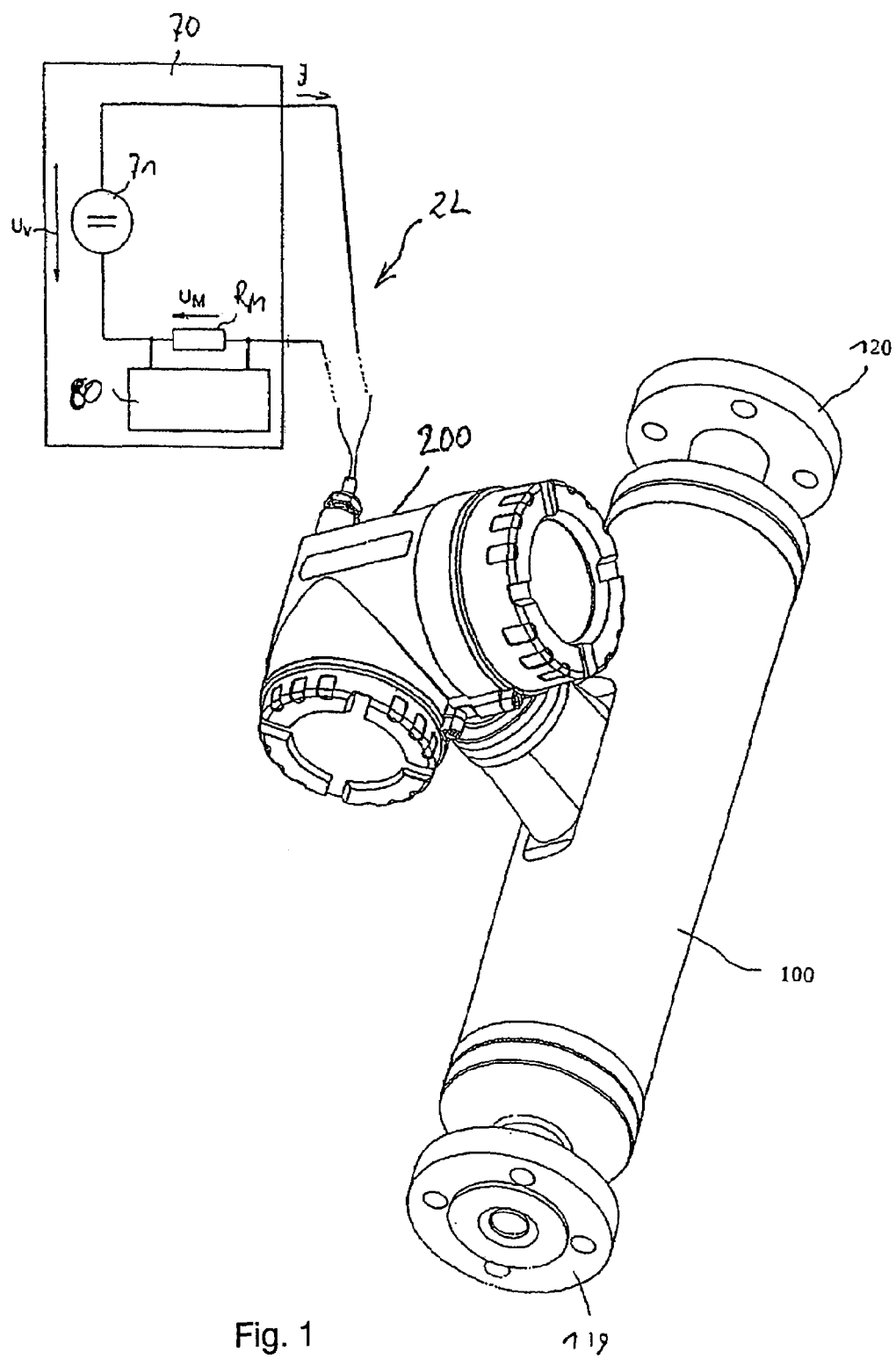
FIG. 1 perspectively in side view, a field device, as well as an external energy supply electrically connected therewith via a pair of electric lines.

While the invention is susceptible to various modifications and alternative forms, exemplary embodiments thereof have been shown by way of example in the drawings and will herein be described in detail. It should be understood, however, that there is no intent to limit the invention to the particular forms disclosed, but on the contrary, the intention is to cover all modifications, equivalents, and alternatives falling within the spirit and scope of the invention as defined by the intended claims.

FIG. 1 shows an example of a field device suited for application in industrial measuring and automation technology, along with a field-device electronics 20 fed from an external, electrical energy supply 70. In operation, the external, electrical energy supply 70 provides an, especially unipolar, supply voltage $U_v$ and delivers in accompaniment therewith a variable, especially binary, supply current I correspondingly driven by the supply voltage $U_v$. For this purpose, the field-device electronics is electrically connected, during operation, with at least a pair of electric lines 2L. As a result of the voltage drop naturally occurring between external energy supply 70 and the input of the field-device electronics 20, the supply voltage $U_v$ is, however, reduced over this distance to the terminal voltage $U_K$ actually present at the input to the field-device electronics.

The field device serves, in an embodiment of the invention, for measuring and/or monitoring, as well as for repeatedly delivering, measured values appropriately representing at least one, earlier designated, physical and/or chemical parameter, such as e.g. a flow rate, density, viscosity, fill level, pressure, temperature, pH-value, or the like, of a medium, especially a gas and/or a liquid, conveyed in a pipeline and/or a container. To this end, the field device includes, additionally, a physical-to-electrical measurement pickup electrically coupled with the field-device electronics for reacting to changes of the at least one parameter and for issuing, at least at times, a measurement signal corresponding to the parameter, especially in the form of a variable signal voltage and/or a variable signal current. Alternatively or supplementally, there can be provided in the field device an electrical-to-physical actuator electrically coupled with the field-device electronics for reacting to changes of at least one applied control signal, especially in the form of a variable signal voltage and/or a variable signal current, with the actuator providing an adjusting movement for influencing the parameter to be adjusted, or, stated differently, the field device can also, for example, be so designed that it serves for adjusting at least one of such physical and/or chemical parameters of the medium. For controlling the field device, especially also for activating the mentioned measurement pickup or for activating the mentioned actuator, there is further provided in the field-device electronics an internal operating and evaluating circuit 50. For the case in which the field device is a measuring device serving for the measuring of the at least one, earlier designated, physical and/or chemical parameter, it is further provided that the operating and evaluating circuit 50 determines the at least one measured value, or a plurality of corresponding measured values, for the parameter.

In the case of the field device illustrated in FIG. 1, such is an in-line measuring device serving especially for registering parameters, e.g. a mass flow rate, density and/or viscosity, of a medium, especially a gas and/or a liquid, flowing in a pipeline (not shown), and for reflecting such in a measured value $X_M$ instantaneously representing this parameter. Accordingly, the field device can be, for example, a Coriolis mass flow measuring device, a density measuring device, or also a viscosity measuring device. For producing the at least one measurement signal, the field device shown here includes a vibration-type measurement pickup 10 accommodated within a corresponding measurement pickup housing 100, as well as field-device electronics 20 accommodated in the illustrated electronics housing 200 and electrically connected in suitable manner with the measurement pickup 10.

Figure 2:
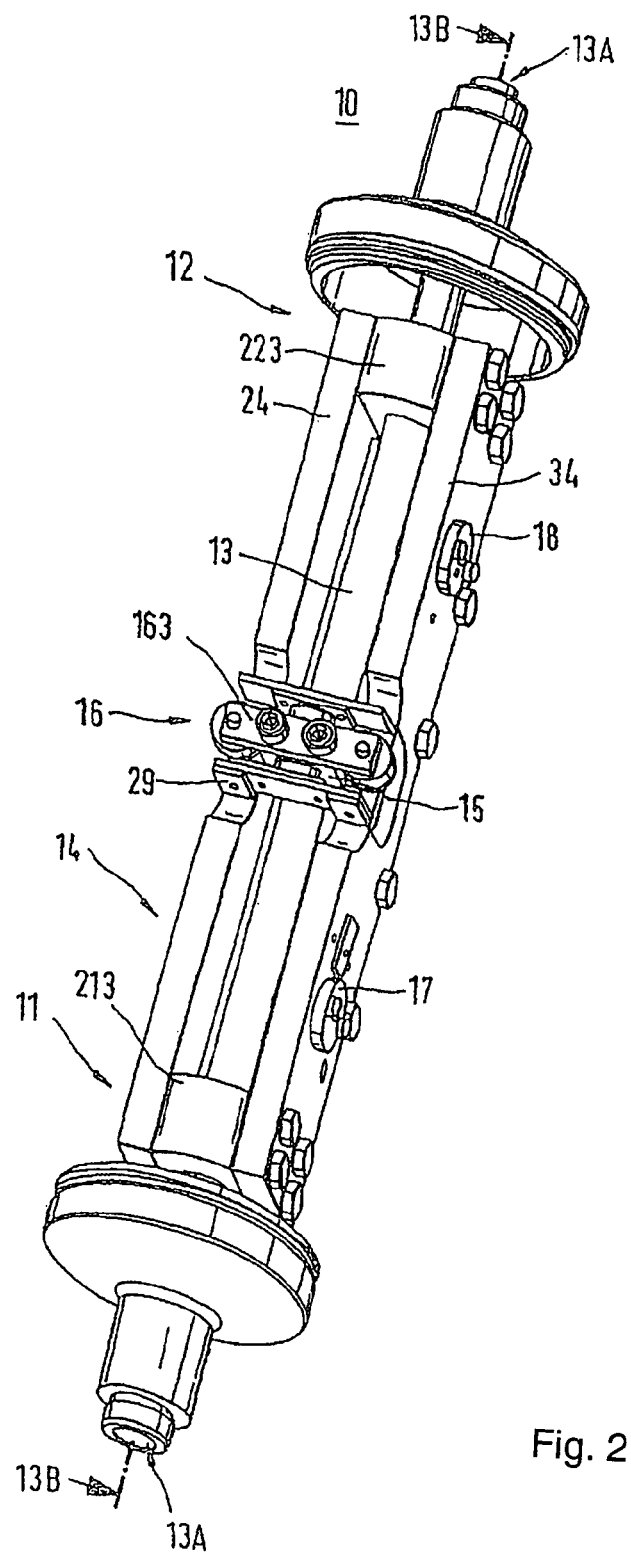
FIG. 2 perspectively in a first side view, partially in section, an example of an embodiment of a vibration-type measurement pickup suitable for the field device of FIG. 1.
Figure 3:
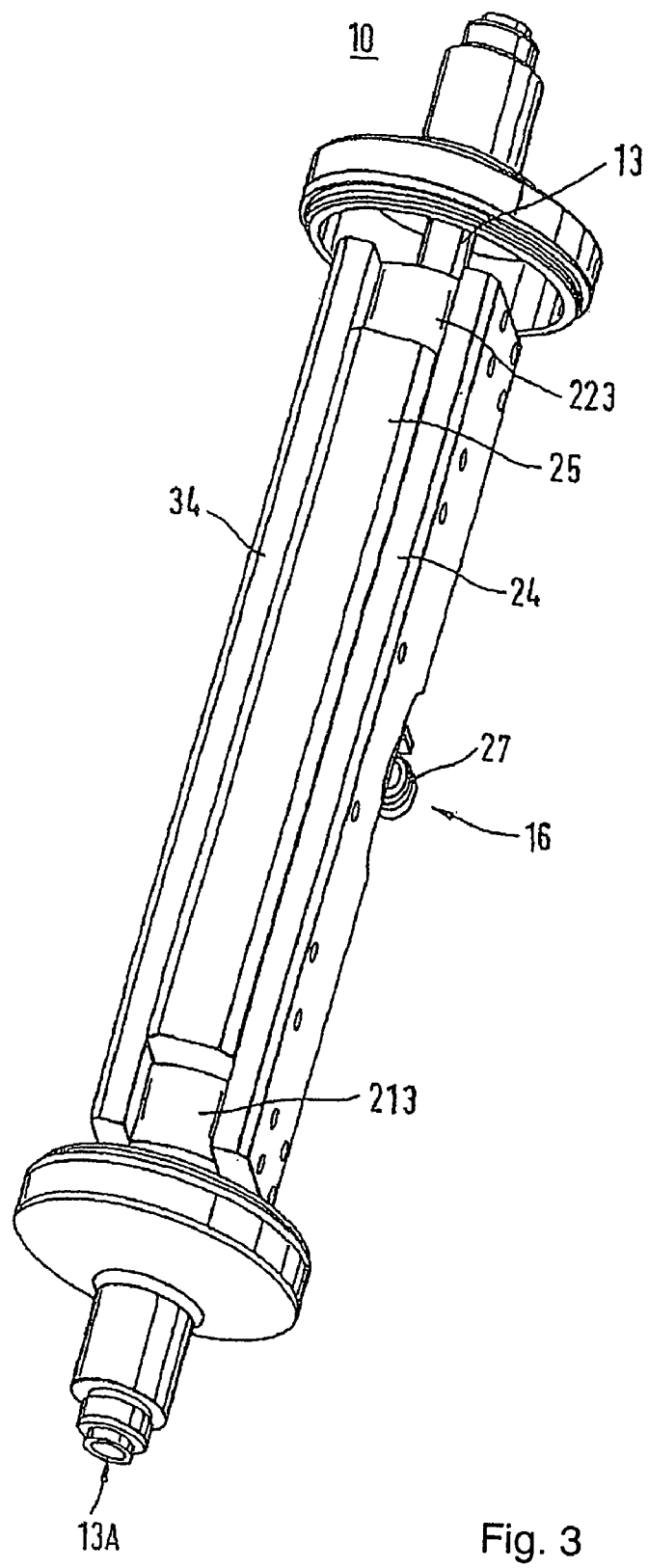
FIG. 3 perspectively in a second side view, the measurement pickup of FIG. 2.
Figure 4:
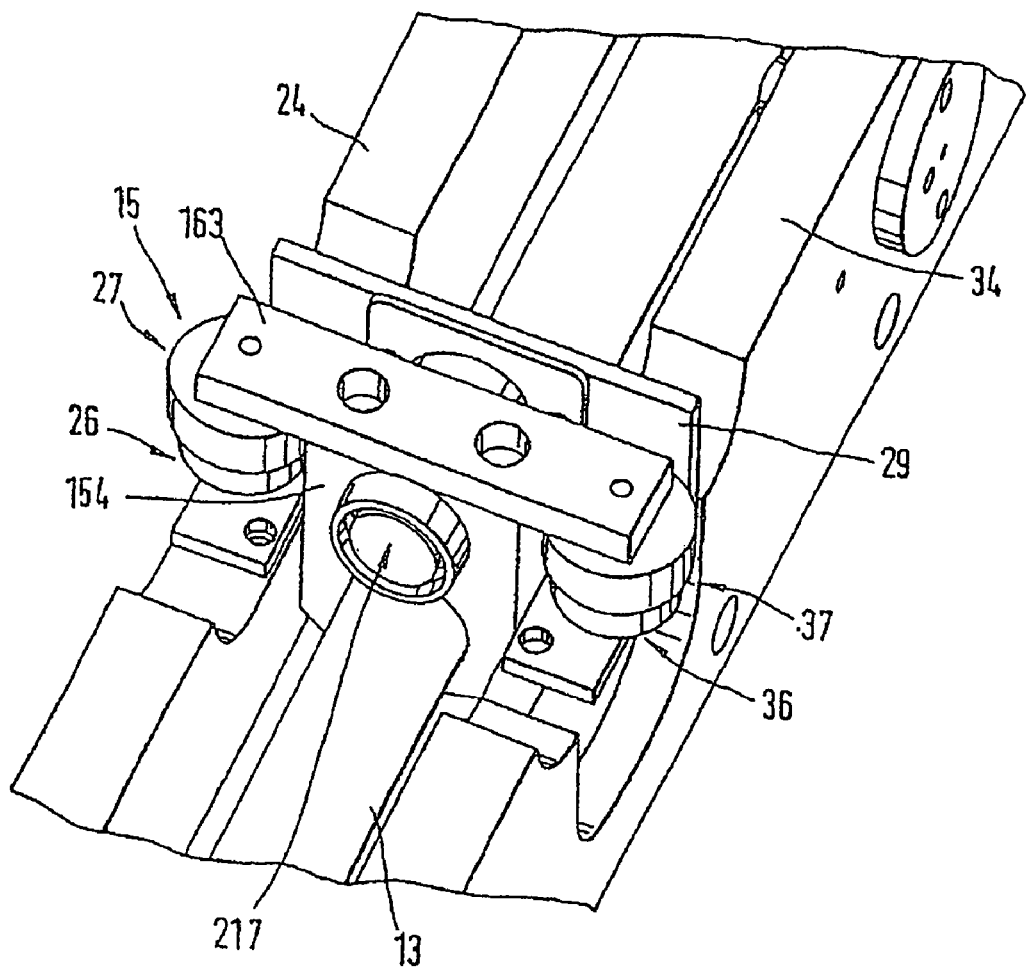
FIG. 4 an example of an embodiment of an electromechanical exciter mechanism for the measurement pickup of FIG. 2.

FIGS. 2 to 4 show an example of an embodiment for such a measurement pickup, whose construction and manner of operation is comprehensively described e.g. also in U.S. Pat. No. 6,006,609. It is noted, however, already here, that, although the example of an embodiment of a field device in this instance concerns an in-line measuring device with a vibration-type measurement pickup, the invention, of course, can be put into practice also in other field devices, for example an in-line measuring devices using magneto-inductive measurement pickups or acoustic measurement pickups. Equally as well, the present invention can also be used in field devices which serve for measuring parameters, for example fill level and/or limit level, such as are determined in connection with containers containing media. Such field devices are usually implemented by means of measurement pickups having at least one measurement probe protruding into a lumen of the container or at least communicating with the lumen, for example a microwave antenna, a Goubau-line, a vibrating, immersion element, or the like.

For conveying the medium to be measured, the measurement pickup 10 of the example of an embodiment as shown in FIGS. 2 to 4 includes at least one measuring tube 13, having an inlet end 11 and an outlet end 12, a predeterminable measuring tube lumen 13A elastically deformable during operation, and a predeterminable nominal diameter. Elastic deformation of the measuring tube lumen 13A means, here, that, for producing the above-mentioned, medium-internal, and, consequently medium-characterizing, reaction forces, a spatial shape and/or a spatial position of the measuring tube lumen 13A is cyclically, especially periodically, changed in predetermined manner within an elastic range of the measuring tube 13; compare e.g. U.S. Pat. No. 4,801,897, U.S. Pat. No. 5,648,616, U.S. Pat. No. 5,796,011 or U.S. Pat. No. 6,006,609. In case required, the measuring tube can, as shown e.g. in EP-A 1 260 798, also be bent, for example. Moreover, it is e.g. also possible to use, instead of a single measuring tube, two bent or straight measuring tubes. Other suitable forms of embodiment for such vibration-type measurement pickups are described comprehensively e.g. in U.S. Pat. No. 6,711,958, U.S. Pat. No. 6,691,583, U.S. Pat. No. 6,666,098, U.S. Pat. No. 5,301,557, U.S. Pat. No. 5,357,811, U.S. Pat. No. 5,557,973, U.S. Pat. No. 5,602,345, U.S. Pat. No. 5,648, 616 or U.S. Pat. No. 5,796,011. Especially suited as material for the straight measuring tube 13 of FIGS. 3 and 4 are e.g. titanium alloys. Instead of titanium alloys, however, also other materials usually used also for such, especially also bent, measuring tubes, can be used, such as e.g. stainless steel, tantalum or zirconium.

The measuring tube 13, which communicates in the usual manner at its inlet and outlet ends with the pipeline conveying the medium into, and out of, the measuring tube, is held oscillatably in a rigid, especially bending- and twisting-stiff, support frame 14 surrounded by the measurement pickup housing 100.

The support frame 14 is affixed to the measuring tube 13 on the inlet end by means of an inlet plate 213 and on the outlet end by means of an outlet plate 223, with these two plates being, in each case, pierced by corresponding extension pieces 131, 132 of the measuring tube 13. Furthermore, the support frame 14 has a first side-plate 24 and a second side-plate 34, both of which plates 24, 34 are affixed, in each case, in such a manner to the inlet plate 213 and to the outlet plate 223, that they extend practically parallel to measuring tube 13 and are arranged spaced from this tube, as well as from each other; compare FIG. 3. Consequently, mutually facing side surfaces of the two side plates 24, 34 are likewise parallel to one another. A longitudinal strut 25 is fixed on the side plates 24, 34, spaced from the measuring tube 13, to serve as a balancing mass absorbing the oscillations of the measuring tube. The longitudinal strut 25 extends, as shown in FIG. 4, essentially parallel to the entire oscillatable length of measuring tube 13; this is, however, not obligatory, since the longitudinal strut 25 can, of course, if necessary, also be made shorter. The support frame 14, with the two side plates 24, 34, the inlet plate 213, the outlet plate 223 and the longitudinal strut 25, thus has a longitudinal line of centers of gravity extending essentially parallel to a measuring tube central axis 13B virtually connecting the inlet end 11 and the outlet end 12. The heads of the screws shown in FIGS. 3 and 4 are to indicate that the mentioned securement of the side plates 24, 34 to the inlet plate 213, to the outlet plate 223 and to the longitudinal strut 25 can occur by threaded connections; however, other suitable securement systems known to those skilled in the are can be used as well. For the case in which the measurement pickup 10 is to be assembled releasably with the pipeline, the measuring tube 13 is provided with a first flange 119 on the inlet end and a second flange 120 on the outlet end; compare FIG. 1. Instead of the flanges 19, 20, also other pipeline connecting pieces can be provided for the releasable connection with the pipeline, such as indicated e.g. in FIG. 3 in the form of so-called triclamp connectors. In case required, the measuring tube 13 can also be connected directly with the pipeline, e.g. by means of welding, hard-soldering or brazing, etc.

For producing the mentioned reaction forces in the medium, the measuring tube 13 is caused, during operation of the measurement pickup 10, to vibrate, and, thus, to elastically deform in predeterminable manner, at a predetermined oscillation frequency, especially a natural resonance frequency, in the so-called wanted mode, driven by an electromechanical exciter mechanism 16 coupled with the measuring tube. As already mentioned, this resonance frequency is also dependent on the instantaneous density of the fluid. In the illustrated example of an embodiment, the vibrating measuring tube 13, as is usual for such vibration-type measurement pickups, is spatially, especially laterally, deflected out of a static, rest position; the same is essentially true also for those measurement pickups, in which one or more bent measuring tubes execute cantilever oscillations about a corresponding, imaginary, longitudinal axis virtually connecting the in- and out-let ends, or also for those measurement pickups, in which one or more straight measuring tubes execute planar, bending oscillations about a measuring tube longitudinal axis. In another case, in which the measurement pickup 10 executes, as described e.g. in the mentioned WO-A 95/16 897, peristaltic, radial oscillations, so that the cross section of the vibrating measuring tube is, in the usual manner therefor, symmetrically deformed, the longitudinal axis of the measuring tube remains in its static, rest position.

Figure 5:
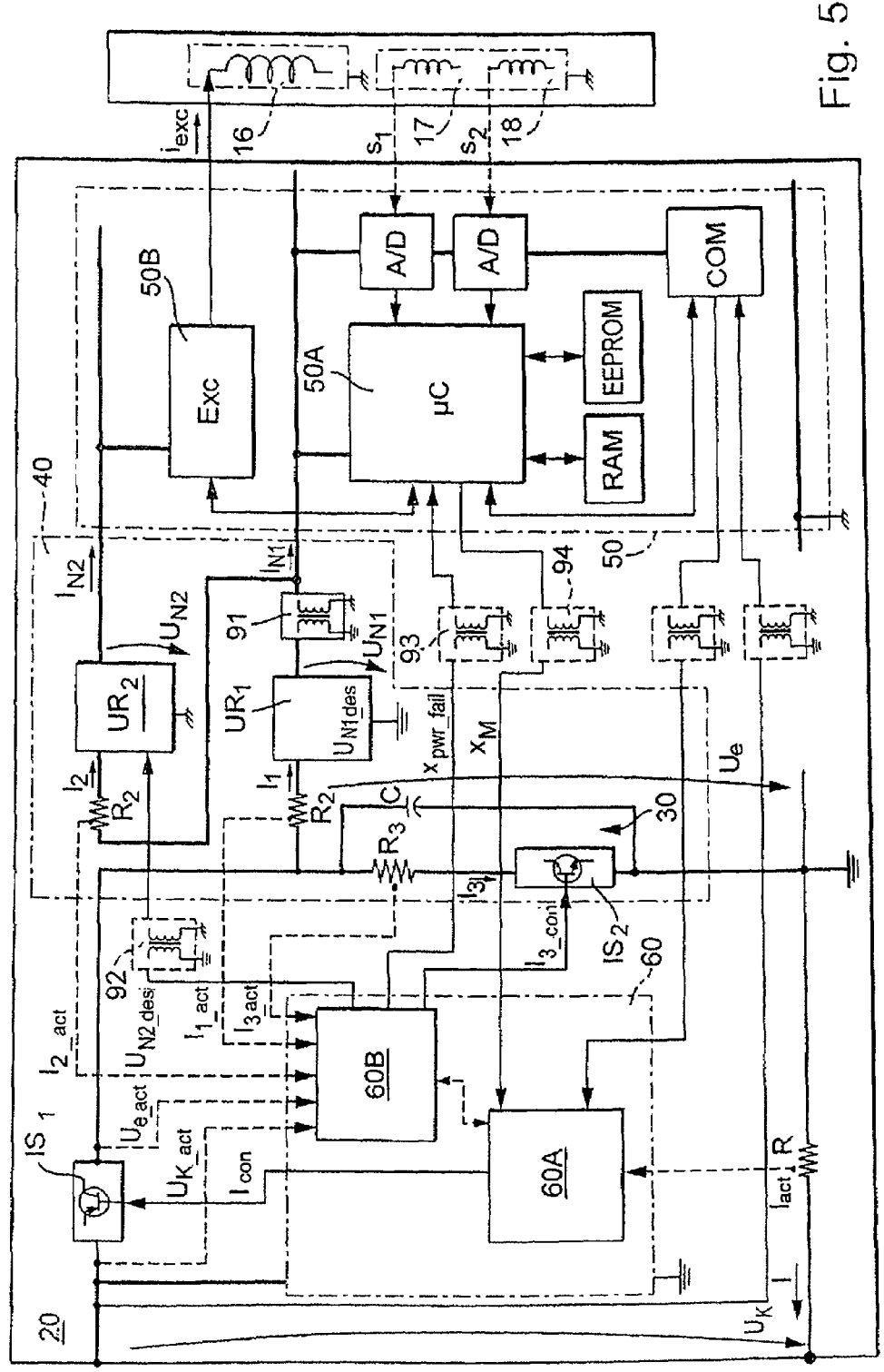
FIG. 5 in the form of a block diagram, a field-device electronics suitable for application in a field device, especially a two-wire field device.

The exciter mechanism 16 serves for producing an exciter force $F_{exc}$ acting on the measuring tube 13, the exciter force being produced by converting an electric exciter power $P_{exc}$ fed from the operating and evaluating circuit 50 in the form of an electric driver signal. The exciter power $P_{exc}$ serves in the case of exciting a natural resonance frequency essentially solely for compensation of the power fraction removed from the oscillation system by mechanical and fluid-internal friction. For achieving a highest possible efficiency, the exciter power is, therefore, adjusted as accurately as possible, such that essentially the oscillations of the measuring tube 13 in the desired, wanted mode, e.g. in a fundamental resonance frequency, are maintained. For the purpose of transferring the exciter force $F_{exc}$ onto the measuring tube, the exciter mechanism 16 includes, as shown in FIG. 4, a rigid, electromagnetically and/or electrodynamically driven, lever arrangement 15 having a cantilever 154 affixed rigidly on the measuring tube 13 and having a yoke 163. Yoke 163 is, likewise rigidly, affixed on one of the ends of cantilever 154 spaced from the measuring tube 13, and, indeed, in such a manner that it is located above the measuring tube 13 and transverse to it. Cantilever 154 can be e.g. a metal disk, or washer, which accommodates the measuring tube 13 in a bore. For other suitable embodiments of the lever arrangement 15, the already mentioned U.S. Pat. No. 6,006,609 is incorporated here by reference. Lever arrangement 15 is T-shaped and so arranged (compare FIG. 4) that it acts on the measuring tube 13 about at the half-way point, between inlet end 11 and outlet end 12, whereby the measuring tube experiences, during operation, its greatest lateral deflection at such half-way point. For driving the lever arrangement 15, the exciter mechanism 16 of FIG. 4 includes a first magnet coil 26 and an associated, first, permanently magnetic, armature 27, as well as a second magnet coil 36 and an associated, second, permanently magnetic, armature 37. The two magnet coils 26, 36, which are preferably connected in series, are affixed, especially releasably, on both sides of the measuring tube 13, to the support frame 14, beneath the yoke 163, such that they can interact with their respectively associated armatures 27, 37 during operation. The two magnet coils 26, 36 can, if required, of course also be connected in parallel with one another. As shown in FIGS. 3 and 5, the two armatures 27, 37 are affixed to yoke 163, mutually spaced from one another, in such a manner that, during operation of the measurement pickup 10, armature 27 is essentially permeated by a magnetic field of coil 26 and armature 37 essentially permeated by a magnetic field of coil 36, and on the basis of corresponding electrodynamic and/or electromagnetic forces, they are moved, especially in a manner involving plunging in their associated magnet coils. The movements of the armatures 27, 37 (especially in their functioning as plunging armatures) produced by the magnetic fields of the magnet coils 26, 36 are transferred by the yoke 163 and by the cantilever 154 to the measuring tube 13. These movements of the armatures 27, 37 are so developed relative to the respectively associated magnet coils that the yoke 163 is deflected from its rest position alternately in the direction of the side plate 24 or in the direction of the side plate 34. A corresponding axis of rotation, parallel to the already mentioned measuring tube central axis 13B can extend e.g. through the cantilever 154. The support frame 14 serving as support element for the exciter mechanism 16 includes, additionally, a holder 29 connected, especially releasably, with the side plates 24, 34, for holding the magnet coils 26, 36, and, as required, individual components of a magnet brake mechanism 217 discussed below.

In the case of the measurement pickup 10 of the example of an embodiment, the lateral deflections of the vibrating measuring tube 13 held clamped securely at the inlet end 11 and the outlet end 12 effect, simultaneously, an elastic deformation of the lumen 13A of the measuring tube. This deformation develops over practically the entire length of the measuring tube 13. Furthermore, simultaneously to the lateral deflections, twisting about the measuring tube central axis 13B is caused in the measuring tube 13, due to the torque acting on such via the lever arrangement 15, so that the measuring tube 13 oscillates essentially in a mixed bending-torsional mode of oscillation serving as wanted mode. The twisting of the measuring tube 13 can, in such case, be so developed, that a lateral deflection of an end of the cantilever 154 spaced from the measuring tube 13 is either equally, or oppositely, directed, compared to the lateral deflection of the measuring tube 13. The measuring tube 13 can, thus, execute torsional oscillations in a first bending-torsional mode corresponding to the equally-directed case or in a second bending-torsional mode corresponding to the oppositely directed case. Then, in the case of the measurement pickup 10 according to the example of an embodiment, the natural, fundamental resonance frequency of the second bending-torsional mode of oscillation is approximately, at e.g. 900 Hz, twice as high as that of the first bending-torsional mode. For the case in which the measuring tube 13 is to execute, during operation oscillations solely in the second bending-torsional mode, a magnetic brake mechanism 217, operating on the eddy current principle, is integrated into the exciter mechanism 16, for stabilizing the position of the mentioned axis of rotation. The magnetic brake mechanism 217 can thus assure that the measuring tube 13 always oscillates in the second bending-torsional mode and, consequently, possible external disturbances on the measuring tube 13 do not lead to a spontaneous switching into another bending-torsional mode, especially not into the mentioned, first mode. Details of such a magnetic braking arrangement are described comprehensively in U.S. Pat. No. 6,006,609.

For causing the measuring tube 13 to vibrate, the exciter mechanism 16 is fed during operation by means of a likewise oscillating exciter current $i_{exc}$, especially one of adjustable amplitude and adjustable exciter frequency $f_{exc}$, in such a manner that this current flows through the magnet coils 26, 36 during operation and, in corresponding manner, the magnetic fields required for moving the armatures 27, 37 are produced. The exciter current $i_{exc}$ is, as schematically shown in FIG. 5, supplied from a driver unit 50B additionally provided in the field-device electronics 20 and can be, for example, a harmonic, alternating current. The exciter frequency $f_{exc}$ of the exciter current $i_{exc}$ is, in the case of the example of an embodiment shown here, preferably so selected, or it adjusts itself, such that the laterally oscillating measuring tube 13 torsionally oscillates, to the extent possible, exclusively in the second bending-torsional oscillation mode.

It is to be noted here, in this connection, that, although in the example of an embodiment shown here, the field-device electronics 20 has only one variable inductive impedance—in this case a magnet coil of variable inductance—fed by the driver unit 50B, the driver unit 50B can also be designed to excite other electrical impedances, for example a measuring capacitor of variable capacitance, or the like. In the case of a capacitive pressure sensor as measurement pickup, its electrical impedance would then change during operation also as a function of the at least one parameter to be measured and/or monitored, with, as is known, a signal voltage falling across the changing electrical impedance and/or a signal current flowing through the changing electrical impedance serving as measurement signal.

For detecting the deformations of the measuring tube 13, the measurement pickup 10 further includes a sensor arrangement, which, as shown in FIGS. 2 and 3, produces, by means of at least a first sensor element 17 reacting to vibrations of the measuring tube 13, a first oscillation measurement signal for representing these vibrations and serving as measurement signal $s_1$. Sensor element 17 can be formed e.g. by means of a permanently magnetic armature, which is affixed to the measurement tube and which interacts with a magnet coil held by the support frame 14. Especially suited as sensor element 17 are especially those, which, based on the electrodynamic principle, register a velocity of the deflection of the measuring tube 13. However, also acceleration-measuring, electrodynamic or even distance-measuring, resistive, or optical sensors can be used. Of course, also other sensors known to those skilled in the art and suitable for the detection of such vibrations can be used, such as e.g. sensors registering strains of the measuring tube 13. The sensor arrangement further includes a second sensor element, especially one identical to the first sensor element 17, by means of which it delivers a second oscillation measurement signal likewise representing vibrations of the measurement tube 13 and, to such extent, serving as a second measurement signal $s_2$. The two sensor elements 17, 18 are, in the measurement pickup illustrated in the example of an embodiment, arranged mutually separated along the measuring tube 13, especially at equal distances from the half-way point along the length of the measuring tube 13, such that the sensor arrangement 17, 18 locally registers both inlet- and outlet-end vibrations of the measuring tube 13 and presents them in the form of corresponding oscillation measurement signals.

FIG. 5 shows, schematically in the form of a block diagram, an embodiment of a field-device electronics 20 suitable for the field device of FIGS. 1 to 4. On the right of FIG. 5, the above described vibration-type measurement pickup is schematically illustrated, with exciter mechanism 16 and sensor arrangement 17, 18, with the magnet coils required for the measurement principle of the pickup being shown symbolically.

The first measurement signal $s_1$, and the second measurement signal $s_2$, which may, or may not, be present, both usually have a signal frequency corresponding to the instantaneous oscillation frequency of the measuring tube 13. These signals are, as shown in FIG. 2, fed to a, preferably digital, evaluation unit 50A of the operating and evaluating circuit provided in the field-device electronics 20. Evaluation unit 50A serves for determining, especially numerically, a measured value, $X_M$, instantaneously representing the process variable to be registered, here e.g. the mass flow rate, density, viscosity, etc., and to convert such into a corresponding measured-value signal xM available at the output of the operating and evaluating circuit. While, in the case of the measurement pickup illustrated here, the density or also viscosity are readily determinable on the basis of just one of the measurement signals $s_1$, $s_2$, for the determining of mass flow rate, both measurement signals $s_1$, $s_2$ are used, in manner known to those skilled in the art, for ascertaining, for example in the signal time domain or in the signal frequency domain, a phase difference corresponding with the mass flow rate.

In an embodiment of the invention, the evaluation unit 50A is implemented using a microcomputer μC provided in the field-device electronics 20. The microcomputer is so programmed that it digitally determines the measured value $X_M$ on the basis of the measurement signals delivered from the sensor arrangement 17, 18. For implementing the microcomputer, e.g. suitable microprocessors and/or also modern signal processors can be used. As also shown in FIG. 5, the evaluation unit 50A further includes at least one A/D converter, via which one of the sensor signals $s_1$, $s_2$ or, as usual especially in the case of Coriolis mass flow pickups, a signal difference derived previously from the two sensor signals $s_1$, $s_2$, is supplied digitized to the microprocessor. The measurement or operational data produced and/or received by the evaluation unit 50A can, furthermore, be stored volatilely and/or persistently in corresponding digital data memories RAM, EEPROM.

As already mentioned, the operating and evaluating circuit 50 further contains a driver unit 50B serving for feeding the exciter mechanism 16 with the mentioned exciter current iexc. Driver unit 50B forms, together with the measuring tube 13, essentially a control loop. This control loop is so designed that it electrically tunes both to the mechanical resonance frequency of the excited vibrations of the measuring tube 13 as well as also to the amplitude of these vibrations predetermined by means of the reference signal Sr. Driver unit 50B can, in such case, be constructed in the usual manner by means of a phase-locked loop, a so-called PLL, for electrical control of the resonance frequency as well as also the phase position of the driver signal and by means of a corresponding amplitude control stage for electrical control of the amplitude of the driver signal, and, as a result, also the amplitude of the vibrations.

As shown in FIG. 5, driver unit 50B is also in contact with the evaluating unit, especially the already mentioned microprocessor μC, from which the driver unit 50B receives e.g. the required operating data, such as e.g. the exciter frequency instantaneously to be set and/or the amplitude and, as required, phase, instantaneously to be set for the exciter current, or to which the driver unit 50B sends internally produced tuning signals and/or parameters, especially also information concerning the set exciter current iexc and/or the exciter power Pexc fed into the measurement pickup. The operating data for the driver unit 50B, exciter frequency, amplitude and/or phase, can, in such case, be both absolute values as well as also relative values. Alternatively or in supplementation thereto, the operating data transmitted to the driver unit 50B can also represent incremental, or decremental, changes of exciter frequency, amplitude and/or phase. In addition to the microprocessor μC, the operating and evaluating circuit 50 can also include a signal generator serving for producing the driver signal, for example a digital signal processor or a programmable logic component, especially a FPGA, configured correspondingly as a signal generator.

FIGS. 6 to 12 show block diagrams of examples of embodiments of the driver unit 50B suited especially also for use in a field device designed as an intrinsically safe measuring device and/or as a 2L-measuring-device.

Figure 6:
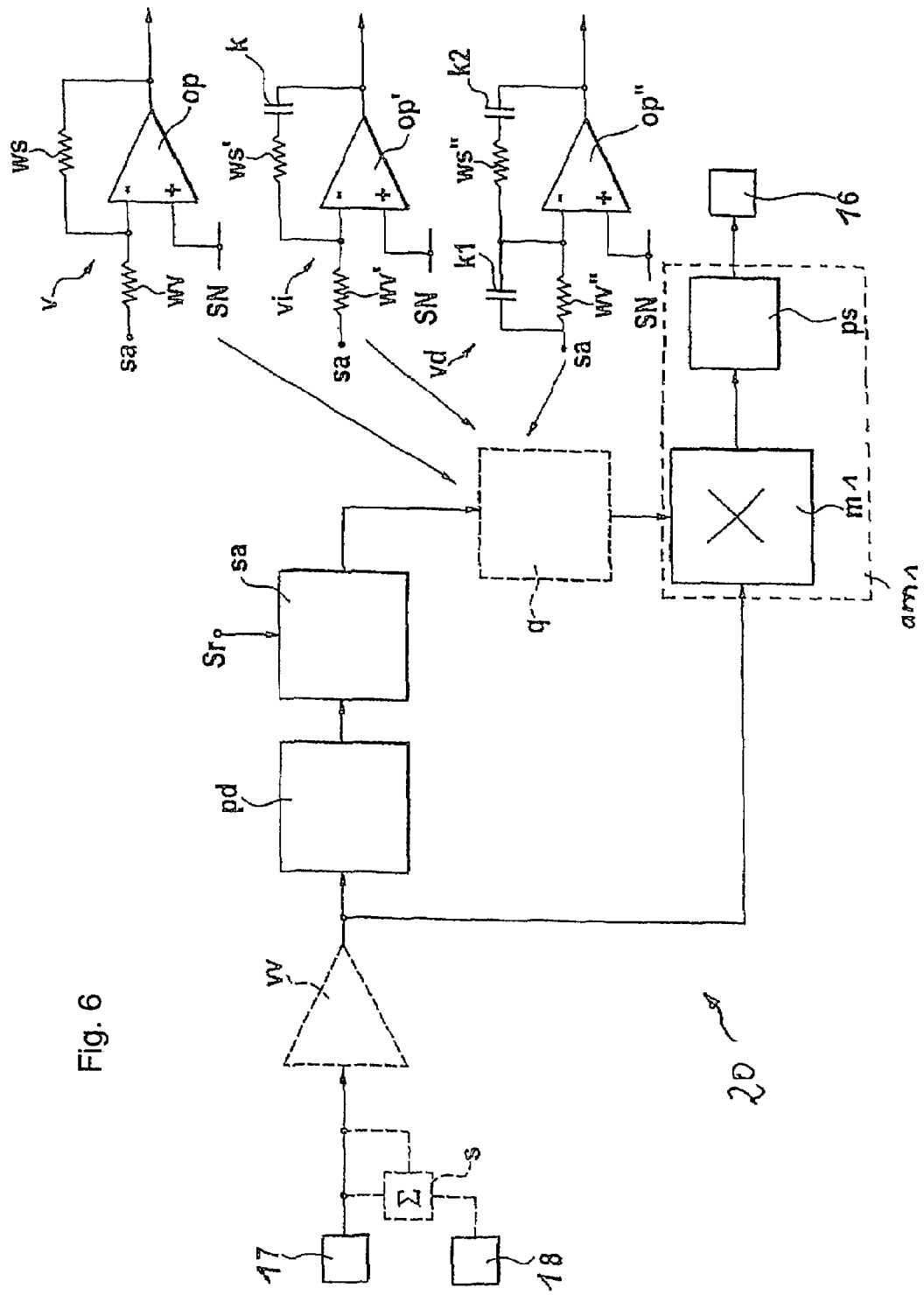
FIGS. 6 to 8 partly in the form of block diagrams, circuits of examples of embodiments of an exciter circuit suited for application in a field device of FIG. 1 having a vibration-type measurement pickup of FIGS. 2 to 4.

In a first variant, one of the sensor signals delivered from the sensors 17, 18 or e.g. also their sum is fed to an amplitude demodulation stage pd as input signal. Thus, the amplitude demodulation stage pd is connected at its input with one of the sensors 17, 18. In FIG. 6, that is the sensor 17. The amplitude demodulation stage pd serves for determining continuously an oscillation amplitude of the measuring tube vibrations. Additionally, the amplitude demodulation stage pd serves for delivering an output signal, e.g. a simple direct-current signal representing this registered oscillation amplitude. To this end, in an embodiment of the invention, a peak value detector is provided for the input signal in the amplitude demodulation stage pd. Instead of this peak value detector, also e.g. a synchronous rectifier can be used for registering the oscillation amplitude. The rectifier is clocked by a reference signal of equal phase to the input signal. A first input of a comparison stage sa is connected with an output of the amplitude demodulation stage pd; a second input of the comparison stage sa receives an adjustable reference signal Sr, which specifies an amplitude of vibration of the measuring tube 13. The comparison stage sa determines a deviation of the output signal of the amplitude demodulation stage pd from the reference signal Sr and issues this as a corresponding output signal. This deviation can be determined and forwarded on the basis of a simple difference between the registered oscillation amplitude and that specified by the reference signal Sr in the form of an absolute amplitude error or e.g. also on the basis of a quotient of registered and specified oscillation amplitudes in the form of a relative amplitude error. To a first input of an amplitude modulation stage am1 is supplied the input signal of the amplitude demodulation stage pd and, to a second input the output signal of the comparison stage sa. The amplitude modulation stage am1 serves for modulating the input signal of the amplitude demodulation stage pd with the output signal of the comparison stage sa. In such case, e.g. one of the sensor signals $s_1$, the sum of the two sensor signals $s_1$, $s_2$ or also a signal essentially proportional thereto, produced synthetically, for example, by means of an appropriate signal generator, can serve as input signal, which, to such extent, is a carrier signal which can be quite variable as to frequency. Onto this carrier signal is modulated the error signal of variable amplitude, as produced by means of the comparison stage sa. The error signal represents, namely, the deviation of the instantaneous vibration amplitude of the measuring tube 13 from its, or their, desired oscillation amplitude represented by the reference signal Sr. Additionally, the amplitude modulation stage am1 serves to deliver the driver signal carrying the driving energy for the exciter mechanism 16. For such purpose, the amplitude modulation stage has a corresponding end stage ps for amplifying the carrier signal modulated with the modulation signal. For the purpose of the amplitude modulation of the carrier signal with the modulation signal, a multiplier m1 is additionally provided in the amplitude modulation stage am1; compare FIG. 6.

Figure 7:
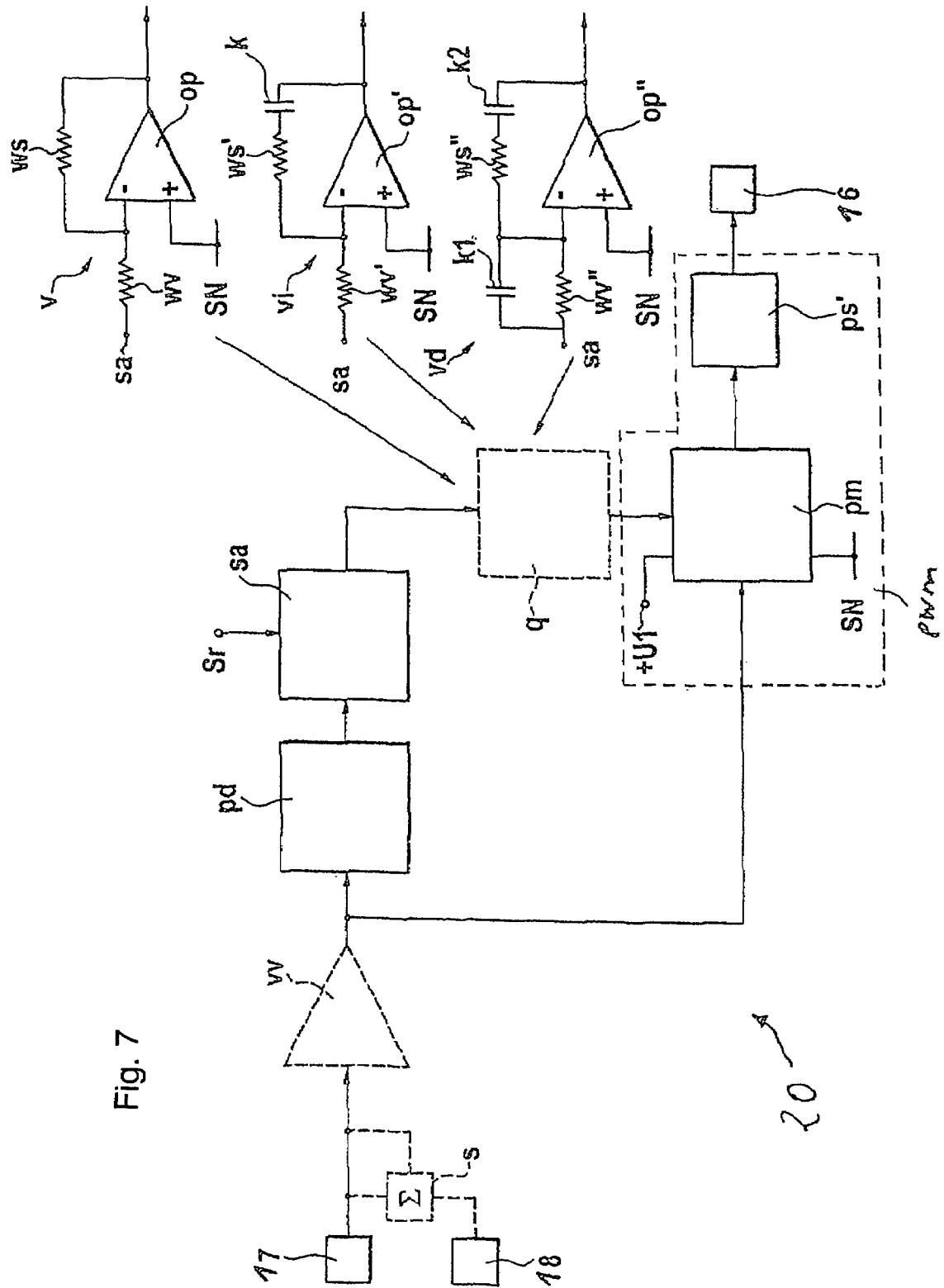

FIG. 7 shows, corresponding to the second variant of the invention, partly in the form of a block diagram, the circuit of a second variant for the driver unit 50B. The example of an embodiment in FIG. 7 differs from that in FIG. 6 essentially in that, instead of its amplitude modulation stage am1, a pulse-width modulation stage pwm is provided, having a pulse-length modulator pm clocked by an external alternating current signal. The pulse-length modulator pm is, as shown in FIG. 7, driven by a constant, positive, first, direct voltage +U1 and lies at circuit ground, or zero point, SN. Supplied to a first input of the pulse-length modulator pm—that is the carrier signal input—is the input signal of the amplitude demodulation stage pd. Thus, this first input is connected with one of the sensors—in FIG. 7 this is again the sensor 17. Supplied to a second input of the pulse-length modulator pm—this is the modulation signal input—is the error signal proportional to the determined amplitude error. The output of the pulse-length modulator pm is, in turn, connected with the input of an end stage ps', which feeds, on its output side, the exciter mechanism 16 with a corresponding driver signal. The driver signal delivered from the end stage ps' is, in this case, a rectangular signal, which is clocked with a signal frequency of the input signal of the amplitude demodulation stage pd and which has a pulse width modulated with the output signal of the comparison stage sa.

Figure 8:
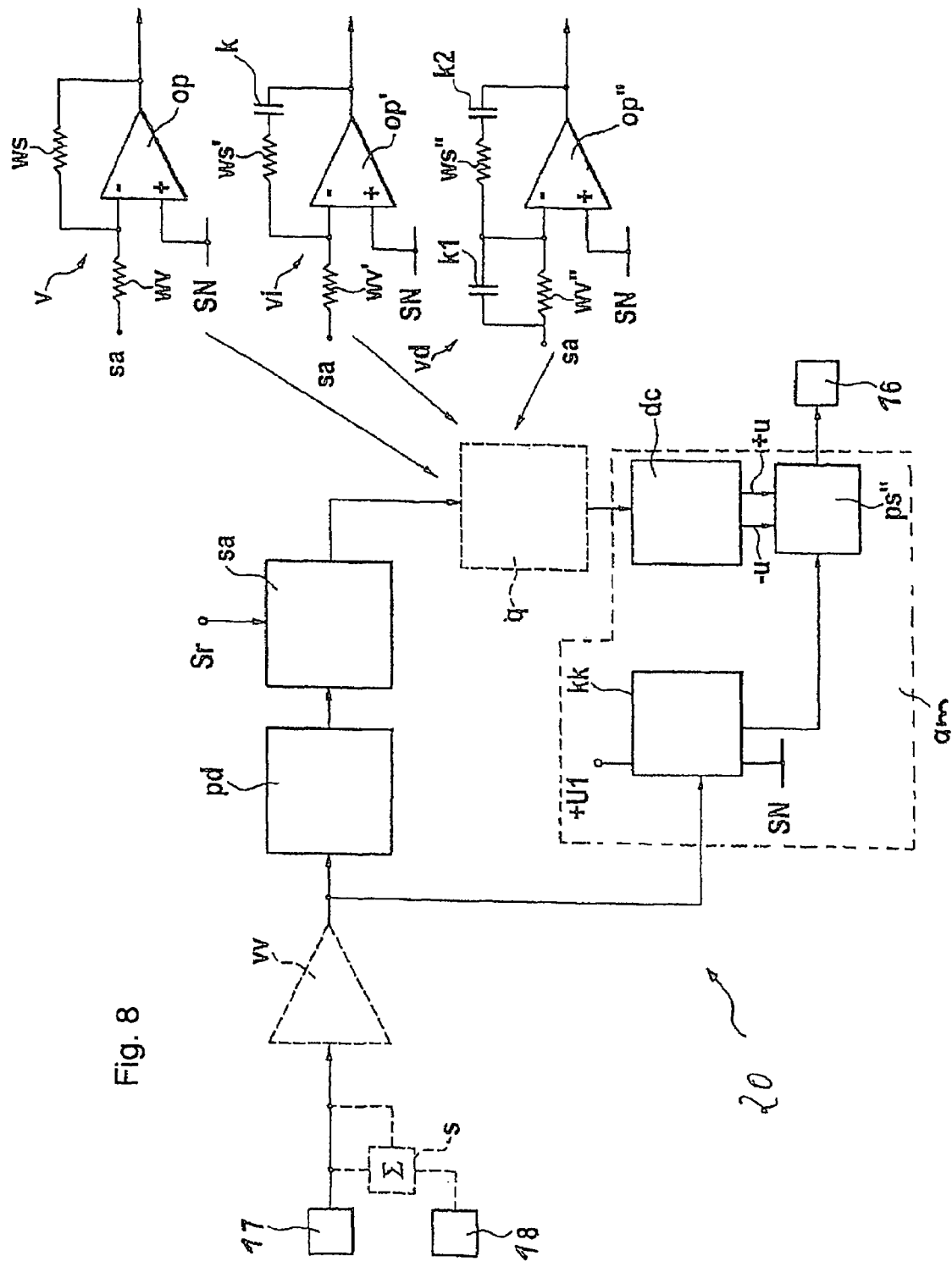

FIG. 8 shows, partly in the form of a block diagram, the circuit of a third variant of the driver unit 50B. The example of an embodiment shown in FIG. 8 differs from that of FIG. 6 in that, instead of its multiplier m1, a comparator kk and a DC-DC converter dc are provided, which delivers at least one driver voltage driving the exciter current $i_{exc}$. The amplitude of this driver voltage is, in turn, dependent on the output signal of the comparison stage sa and, therefore, is to be considered as non-constant. Depending on the driver voltage, the exciter current $i_{exc}$ can, as already mentioned, be bi-polar or, however, also unipolar. Consequently, the DC-DC converter dc delivers, in a further embodiment of the invention according to FIG. 8, a driver voltage having a positive first potential +u and a negative second potential −u, with a control input of the DC-DC converter dc serving for adjusting of the potentials and receiving the output signal of the comparison stage sa. The driver voltage delivered by the DC-DC converter dc, appropriately adapted in its amplitude, is applied to an end stage ps" of the pulse width modulation stage pwm as operating voltage and the end stage ps", in turn, feeds the exciter mechanism 16. Moreover, the end stage ps" is connected on its input side with an output of the comparator kk. Comparator kk is operated by the constant, positive, first direct voltage +U1 and lies at circuit ground SN. Supplied to an input of the comparator kk is the input signal of the peak value detector pd. Consequently, comparator kk is connected on its input side with one of the sensors—in FIG. 8 this is again the sensor 17.

In FIGS. 6 to 7, it is indicated in each case by dashed lines that, instead of one of the sensor signals of the sensors 17, 18, also their sum can be supplied to the peak value detector pd and to the multiplier ml, or to the pulse-length modulator pm, or to the comparator kk, as the case may be; then, these sensor signals have to be passed through a summing unit. Alternatively, however, as already mentioned, a synthetic signal can be used, produced by means of a digital signal processor and a D/A converter connected to its output, and correspondingly adapted to the sensor signal in its frequency and phase position. In FIGS. 6 to 7, still other circuit portions are shown in dashed representation, to indicate further developments of the exciter circuit. In one further development of the driver unit 50B, a pre-amplifier vv is provided, which is placed in front of the peak-value detector pd or, as required, the synchronous rectifier. In another further development of the driver unit 50B, an amplifier v is provided, which amplifies the output signal of the comparison stage, before it reaches the amplitude modulation stage as error signal. Such an amplifier can be an operational amplifier op, whose non-inverting input lies at circuit ground SN, whose inverting input is connected via a series resistor wv with the output of the comparison stage sa and via a shunt resistor ws with the amplifier output. The operational amplifier connected in this manner is, in each case, shown at the right top in FIGS. 6 to 7. In a next further development of the driver unit 50B, an integrating amplifier vi is provided, which amplifies and integrates the output signal of the comparison stage sa, before it reaches the multiplier m as error signal. Such an amplifier can be an operational amplifier op', whose non-inverting input lies at circuit ground SN, and whose inverting input is connected with the output of the comparison stage sa via a series resistor wv' and, via a series circuit formed of a shunt resistor ws' and a capacitor k, with the output of the amplifier. The operational amplifier op' connected in this manner is shown in each case in the right-middle of FIGS. 6 and 7.

Another further development of the driver unit 50B utilizes a differentiating and integrating amplifier vd, which amplifies, differentiates and integrates the output signal of the comparison stage sa, before it reaches multiplier ml as error signal. Such an amplifier can be an operational amplifier op", whose non-inverting input lies at circuit ground SN, and whose inverting input is connected via a parallel circuit of a series resistor wv" and a first capacitor k1 with the output of the comparison stage sa and via a series circuit of a shunt resistor ws" and a second capacitor k2 with the amplifier output. The operational amplifier op" connected in this manner is shown in FIGS. 6 and 7 in each case at the right-bottom of the figure. The arrows in FIGS. 6 and 7 indicate that the relevant amplifier v, vi, vd is to be placed in the box q (shown in dashed representation), which lies either between the output of the comparison stage sa and the second input of the amplitude modulation stage am, or, however, between the output of the comparison stage sa and the modulation signal input of the pulse-width modulation stage pwm.

Quite within the framework of the invention is to have the functions of the individual circuit portions of FIGS. 6 and 7 implemented by corresponding analog or digital circuit portions, in the latter case, thus e.g. by means of a suitable programmed microprocessor, with the signals going to such being first passed through an analog/digital conversion and its output signals, if required, being subjected to a digital/analog conversion.

Figure 9:
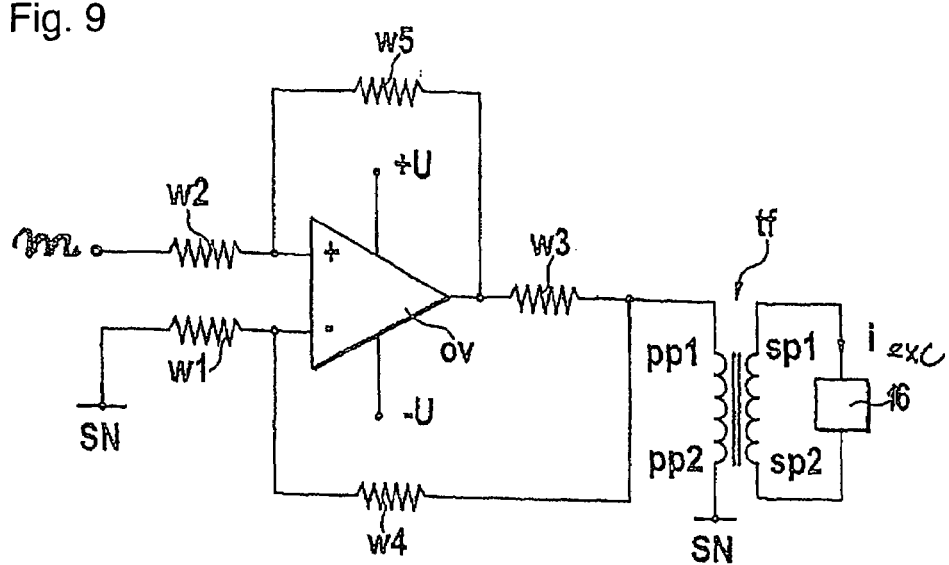
FIGS. 9 to 12 circuit diagrams of examples of embodiments of end stages suitable for the exciter circuits of FIGS. 6 to 8.

FIG. 9 shows a circuit of a first example of an embodiment of an end stage ps, which can be inserted, for example, in the amplitude modulation stage am of FIG. 6. An operational amplifier ov is powered by a positive and a negative, in each case constant, direct voltage +U, −U and is connected as follows. An inverting input lies, via a first resistor w1, at circuit ground SN and a non-inverting input is connected via a second resistor w2 to the output of the multiplier ml. An output of the operational amplifier ov is connected through a third resistor w3 with a first terminal pp1 of a primary winding of a transformer tf; a second terminal pp2 of the primary winding lies at circuit ground SN. The secondary winding of transformer tf is connected by means of its two terminals sp1, sp2 to the exciter mechanism 16.

The primary winding has a primary winding number N1 and the secondary winding a secondary winding number N2. The transformer tf is a current step-up transformer and has a transformation ratio of e.g. 20:1. The inverting input of the operational amplifier ov is connected through a fourth resistor w4 to the first terminal pp1 of the primary winding. The non-inverting input is connected with the output through a fifth resistor w5. The five resistors w1, w2, w3, w4, w5 have corresponding resistance values R1, R2, R3, R4, R5. The resistance value R1 is selected equal to the resistance value R2, and the resistance value R4 is selected equal to the resistance value R5. The alternating current i flowing into the exciter mechanism 16 is as follows, where um is the output voltage of the multiplier m: R5N1 1=um m R1 R3 N2.

Figure 10:
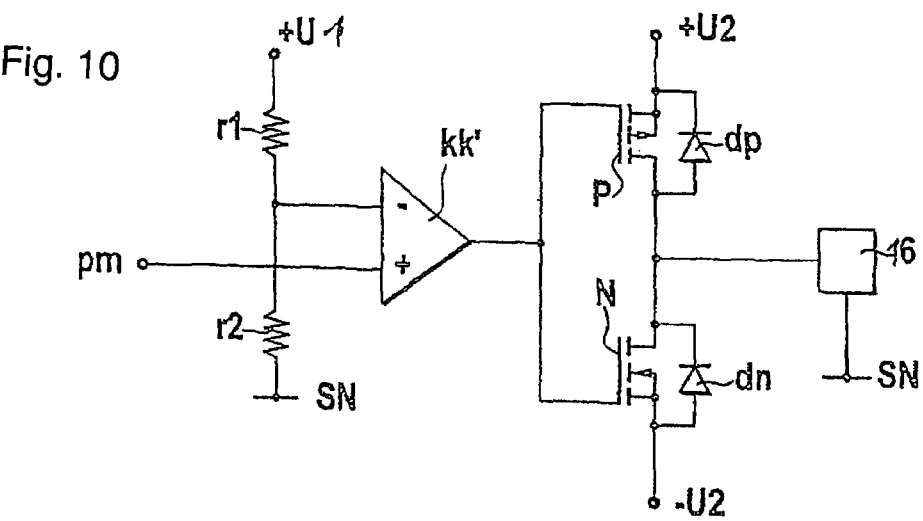

FIG. 10 shows a circuit of a second example of an embodiment of an end stage ps', which can be inserted, for example, in the pulse-width modulation-stage pwm of FIG. 7. The "core" of this embodiment of the end stage, which is a complementary push-pull end stage, is a series connection of the controlled current path of a p-channel-enhancement, insulating layer, field-effect transistor P with an n-channel-enhancement, insulating layer, field effect transistor N, which will be referenced in the following as "transistors" for short. The exciter mechanism 16 is connected to the junction point of the controlled current paths. On each controlled current path, a protective diode dn, dp is connected in parallel, with each cathode lying on the positive point of the associated transistor. The end of the series connection on the p-transistor-side lies at a constant, positive, second direct voltage +U2 and its end on the n-transistor-side lies at a corresponding, negative direct voltage −U2. The gates of the transistors N, P are connected together and with an output of the comparator kk'. The non-inverting input of the comparator kk' lies on the output of the pulse-length modulator pm; compare FIG. 7. The inverting input of the comparator kk' is connected with a tap of a voltage divider composed of a resistor r1 and a resistor r2. The resistors r1, r2 have the same resistance values and lie between the positive, direct voltage +U1 and circuit ground SN. The resistors r1, r2 and the comparator kk' serve for making the output signal of the pulse-length modulator pm symmetrical with reference to the half-value of the direct voltage +U1. The exciter mechanism 16 receives, consequently, at every positively directed edge through zero for the output signal of the sensor 17, or the sum of the output signals of the sensors 17, 18, as the case may be, a positive current pulse and, at every negatively directed edge through zero for the output signal of the sensor 17, or the sum of the output signals of the sensors 17, 18, as the case may be, a negative current pulse. The respective durations of these current pulses are adjusted automatically, such that the oscillation amplitude of the measuring tube 13, as specified by the reference signal Sr, is achieved.

Figure 11:
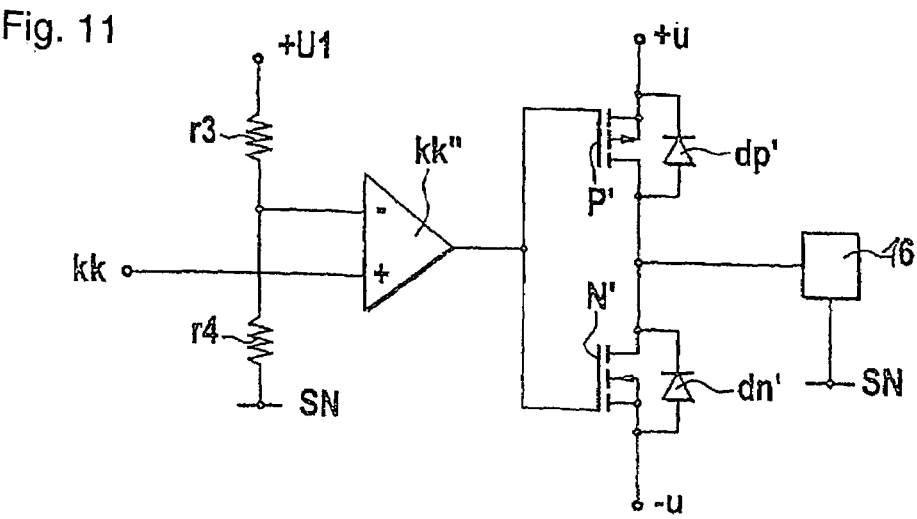

FIG. 11 shows a circuit diagram of another example of an embodiment of an end stage ps", which can be inserted, for example, in the amplitude modulation stage am1 of FIG. 8. The "core" of this embodiment of the end stage, which again is a complementary push-pull end stage, is, also here, as in the case of FIG. 10, a series connection of the controlled current path of a p-channel-enhancement, insulating layer, field-effect transistor P' with an n-channel-enhancement, insulating layer, field effect transistor N', which will again be referenced in the following as "transistors" for short. The exciter mechanism 16 is connected to the junction point of the controlled current paths. On each controlled current path, a protective diode dn', dp' is connected in parallel, with each cathode lying on the positive point of the associated transistor. The end of the series connection on the p-transistor-side lies at a positive, second direct voltage +u dependent on the output signal of the comparison stage sa and its end on the n-transistor-side lies at a negative direct voltage −u dependent on the output signal of the comparison stage sa. The gates of the transistors N', P' are connected together and with an output of the comparator kk". The non-inverting input of the comparator kk" lies on the output of the comparator kk; compare FIG. 8. The inverting input of the comparator kk" is connected with a tap of a voltage divider composed of a resistor r3 and a resistor r4. The resistors r3, r4 have the same resistance values and lie between the positive, direct voltage +U1 and circuit ground SN. The resistors r3, r4 and the comparator kk" serve for making the output signal of the comparator kk symmetrical with reference to the half-value of the direct voltage +U1. The exciter mechanism 16 receives, consequently, at every positive half-wave of the output signal of the sensor 17, or of the sum of the output signals of the sensors 17, 18, as the case may be, a positive current pulse and, at every negative half wave of the output signal of the sensor 17, or of the sum of the output signals of the sensors 17, 18, as the case may be, a negative current pulse. The respective amplitudes of these current pulses are dependent on the direct voltages +u, −u, which are themselves dependent on the output signal of the comparison stage sa, so that the oscillation amplitude of the measuring tube 13, as specified by the reference signal Sr, is achieved automatically.

Figure 12:
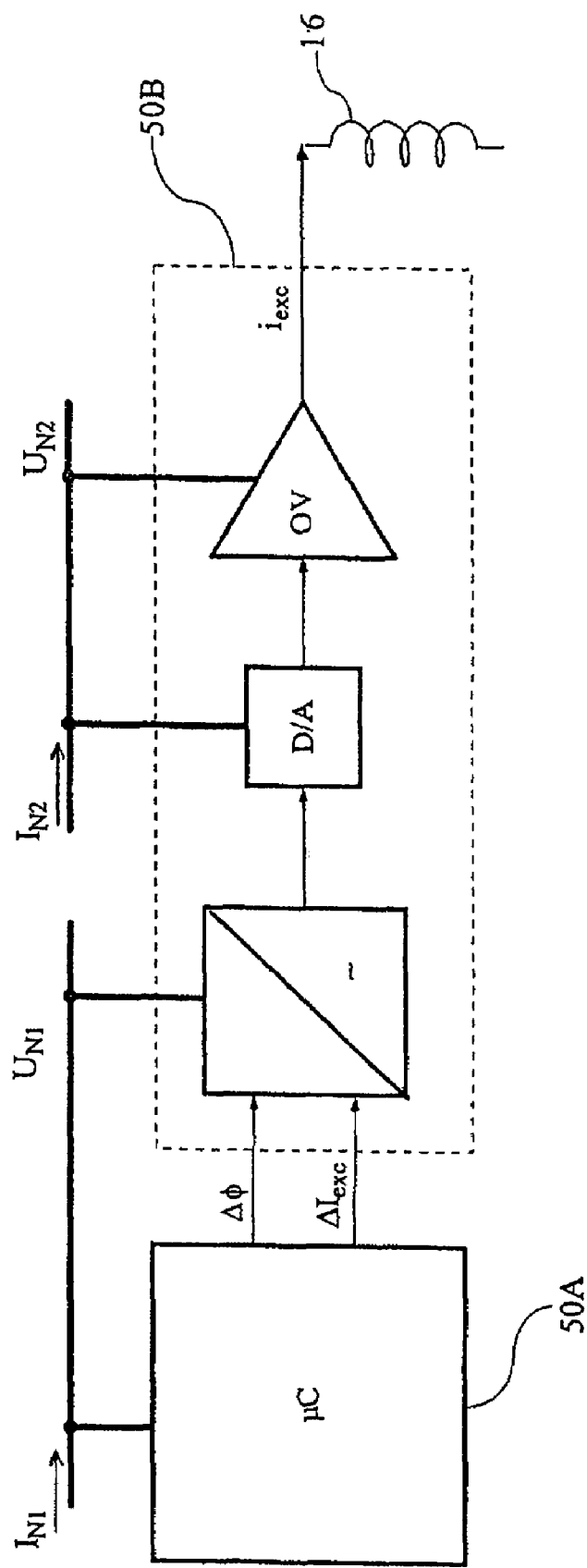

Finally, FIG. 12 shows schematically in the form of a block diagram an example of an embodiment for a hybrid (thus, operating partly digitally and partly analogly) driver circuit 50B. Driver circuit 50B includes a digital signal generator, which serves for converting default values, especially numerical default values, produced by the microcomputer 50A for individual parameters of the exciter signal, for example an amplitude of the exciter current $i_{exc}$, a phase of the exciter signal and/or an oscillation frequency of the same, into a corresponding, digital, oscillation signal. The individual parameters can, as already mentioned, in such case, be transmitted, for example, as absolute values and/or incremental, or decremental, values, as the case may be, to the driver unit 50B.

As already mentioned, the field-device electronics, and, to such extent, also the field device, are fed from an external, electrical energy supply 70, for example a remotely located measurement transmitter supply device or the like, which is connected with the field device, or, more accurately, with the field-device electronics 20, via the at least one pair of electric lines 2L. The measurement transmitter supply device, in turn, can, for example, be connected via a field bus system with a superordinated process control system stationed in a process control room. In the example of an embodiment shown here, the field-device electronics, as usual in a multitude of measurement and automation technology applications, is electrically connected with the external electrical energy supply solely via a single pair of electric lines 2L. Accordingly, the field-device electronics is thus, on the one hand, supplied with electric energy via this one pair of lines. On the other hand, it is provided that the field-device electronics transmits the measured value $X_M$, produced at least at times, to an external evaluating circuit 80 located in the external electric energy supply 70 and/or electrically coupled with the energy supply, likewise via the single pair of electric lines 2L. The pair of electric lines 2L, in this case, the single pair, connecting the measurement transmitter supply device and the field device can, for example, for such purpose, be connected in series with an energy source 71 feeding the supply current I, e.g. a battery or a direct voltage source fed via an installation-internal supply network, and with measuring resistor $R_M$. Energy source 70 drives the supply current I and supplies, therefore, the field-device electronics 20 with the electric energy required for its operation. The measuring resistor $R_M$ is additionally provided with two measuring terminals 72, 73, on which the supply current instantaneously representing the measured value $X_M$ can be sensed in the form of a current-proportional, measured voltage $U_M$. The measured voltage $U_M$ can be visualized on-site or fed to a superordinated, measured value processing unit. The—here, single—pair of electric lines 2L can be embodied, for example, as a so-called two-wire, current loop, especially a 4 mA-20 mA current loop, or as a connecting line to an external, digital field bus, for example, a PROFIBUS-PA or a FOUNDATION-FIELD-BUS.

In a further embodiment of the invention, it is, therefore, further provided that the instantaneous measured value $X_M$ is modulated onto the supply current I. For example, the measured value instantaneously determined by means of the field device can be represented by an instantaneous current level (especially an electrical current level adjusted to a value lying between 4 mA and 20 mA) of the supply current I flowing in the pair of electric lines 2L embodied as a two-wire, or two-conductor, current loop.

In another embodiment of the invention, it is provided that the field device communicates, for example exchanges field-device-specific data, via a data transmission system, at least at times, with an external control and review unit, for example, a handheld operating device or a programmable logic controller. For this purpose, there is additionally provided in the field-device electronics 20 a communication circuit COM, which reviews and controls the communication via the data transmission system. Especially, the communication circuit serves for converting, besides the measured value $X_M$, e.g. also internal field-device parameters, into signals, which are transmittable over the pair of electric lines 2L, and for then coupling these signals into such lines. Alternatively or in supplementation thereof, the communication circuit COM can, however, also be designed for correspondingly receiving field-device parameters sent from the outside over the pair of electric lines 2L. The communication circuit COM can be, especially for the above-described case in which the field device is connected during operation solely via a two-wire current loop to the external supply circuit, e.g. an interfacing circuit working according to the HART@-Field-Communication-Protocol of the HART Communication Foundation, Austin, Tex., which uses FSK-coded, high-frequency, alternating voltages as signal carrier.

As is evident from the combination of FIGS. 1 and 5, the field-device electronics has, for the adjusting and control of voltages and/or currents internally in the field device, further, at least one current adjuster $IS_1$, through which the supply current I flows, for adjusting and/or modulating, especially clocking, of the supply current I. Additionally provided in the field-device electronics 20 is an internal supply circuit 40, which lies at an internal input voltage $U_e$ of the field-device electronics 20 derived from the terminal voltage $U_K$ and which serves for the electrical feeding of the internal operating and evaluating circuit 50.

For registering and regulating voltages instantaneously dropping in the field-device electronics 20 and/or instantaneously flowing currents, the supply circuit further includes a corresponding measuring and control unit 60. Moreover, the measuring and control unit 60 serves, especially for the above-mentioned case in which the measured value $X_M$ is modulated onto the supply current I, also for converting a measured-value signal $x_M$, as supplied from the operating and evaluating circuit 50 and representing the instantaneously produced, measured value $X_M$, into a correspondingly controlling, first current control signal $I_{control}$ controlling the current adjuster $IS_1$ and, to such extent, also the supply current. To this end, the measuring and control unit 60 includes a corresponding current control circuit 60A, which converts the measured value signal $x_M$ delivered by the internal operating and evaluating circuit 50 to the measuring and control unit 60 appropriately into the current control signal $I_{control}$. The control circuit 60A of the measuring and control unit 60 thus forms, together with the current adjuster $IS_1$, for practical purposes, a current controller (in this case, a so-called linear, longitudinal controller) for the supply current I. The current control signal control is, in an embodiment of the invention, so adapted that the current adjuster $IS_1$ becomes able to control the supply current I on the basis of the instantaneously determined measured value $X_M$ proportionally thereto. Alternatively, or in supplementation thereof, the current control signal $I_{control}$ is so developed that the current adjuster $IS_1$ strobes the supply current, for example binary coded for the purpose of communication according to the standard PROFI-BUS-PA. For producing correspondingly current-representing, especially essentially current-proportional, sense voltages $I_{1\_actual}$, $I_{2\_actual}$, $I_{3\_actual}$, corresponding sense resistors $R_1$, $R_2$, $R_3$ are additionally provided in the supply circuit 40. At least at times, the supply current, or current components $I_1$, $I_2$, $I_3$ derived therefrom, flow through the respective resistors $R_1$, $R_2$, $R_3$.

At least for the above-described case, in which the supply current is modulated in its amplitude for the purpose of representing the measured value $X_M$, and, due to the limited electric power of the external energy supply, the supply voltage $U_v$ delivered therefrom and, consequently, associated therewith, also the terminal voltage $U_K$ correspondingly sink with increasing supply current I, or, the reverse, with sinking supply current I they again increase, the supply voltage $U_v$ and, to such extent, also the terminal voltage $U_K$ are to be considered fluctuating in voltage level in, at first, non-determinable manner and, to such extent, variable during operation in significant measure. When the field device works according to the above-mentioned, in industrial measurement technology long-established standard of 4 mA to 20 mA, the only available current range for energy supply in normal operation is that beneath 4 mA, and, depending on the level of the supply voltage, the permanently available electric power is then only around 40 to 90 mW (=milliwatts).

The supply circuit 40 therefore has, as also schematically shown in FIG. 5, additionally, at the input, a voltage adjuster 30, which, controlled by the measuring and control unit 60, is provided for the purpose of adjusting an internal input voltage $U_e$ (serving as primary, or base, voltage for the internal energy supply) of the field-device electronics as accurately as possible to a predetermined voltage level (which, on occasion, can also be varied during operation) and for maintaining such at this, for the moment selected, voltage level also as constantly at the same level as possible, at least for the undisturbed, normal operation, wherein, among other things, the terminal voltage $U_K$ is at least equal to a minimum voltage value $U_{K\_min}$. The measuring and control unit 60 forms, as a result, together with the voltage adjuster 30, an input voltage controller for the internal input voltage $U_e$ and serves, especially, for adjusting and stabilizing this as accurately as possible.

Figure 13:
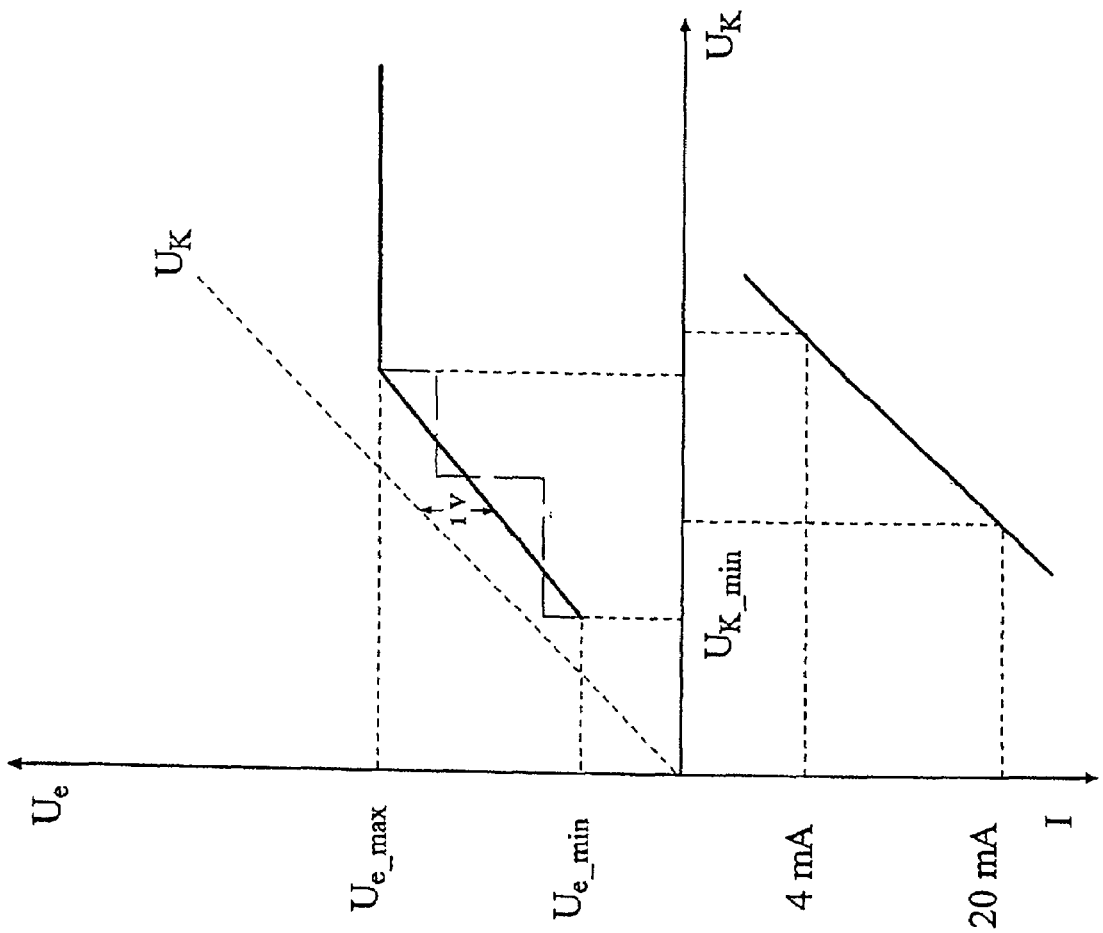
FIG. 13 schematically, dependencies of voltage components in the field device electronics of FIG. 5.

The voltage level of the internal, input voltage $U_e$ is, in an embodiment of the invention, so maintained, that the internal input voltage $U_e$ is, as also shown schematically in FIG. 13, always lower than the terminal voltage $U_K$. In such case, the voltage level, at which the internal input voltage $U_e$ is held by means of the aforementioned input voltage controller 30, 60, can, during operation, be, for example, essentially continuously changed as a function of the instantaneously flowing, supply current I. Alternatively thereto, however, it is also possible to hold the voltage level constant over a certain current-strength range of the supply current and, as a result, also over a corresponding voltage range of the terminal voltage $U_K$, and, as indicated in FIG. 13 by means of the dash-dotted line, to change stepwise, for example at exceeding or falling beneath predetermined threshold values for the supply current I and/or the terminal voltage $U_K$. In a further embodiment of the invention, the input voltage controller 30, 60 is so designed, that the voltage level is held constant after the reaching of a predetermined or predeterminable, maximum voltage level $U_{e\_max}$, for example in an order of magnitude of 15 V, despite possibly further increasing terminal voltage $U_K$ to values, for example, over 20 V. As a result, the input voltage controller 30, 60 thus acts not only as a voltage stabilizer for the internal input voltage $U_e$ but also as a voltage limiter therefor.

For the further, internal, distribution of the electric energy to individual components or groups of the field-device electronics, such further includes, for converting the stabilized, internal, input voltage $U_e$, a first useful-voltage controller $UR_1$, which, at least at times, is flowed-through by an, especially variable, first current component $I_1$ of the supply current and which serves for providing a first internal, useful voltage $U_{N1}$ in the field-device electronics 20. This voltage $U_{N1}$ is essentially constantly controlled to a predetermined, as required also parameterable, desired first voltage level $U_{N1\_desired}$.

Additionally provided in the supply circuit 40 is a second voltage controller $UR_2$ likewise converting the stabilized, internal input voltage $U_e$. This second voltage controller $UR_2$ is flowed-through, at least at times, by an especially variable, second current component $I_2$ of the supply current I. The second voltage controller $UR_2$, in turn, serves for making available in the field-device electronics 20 a second internal useful voltage $U_{N2}$, which is variable over a predetermined voltage range. The voltage level for the useful voltage $U_{N2}$ best-suited for the instantaneous situation as regards consumption in the field-device electronics can be determined, for example, by the measuring and control unit 60 with regard to an instantaneous consumption situation in the field-device electronics and then forwarded correspondingly to the useful-voltage controller $UR_2$ in the form of a voltage control signal $U_{N2\_desired}$. The voltage control signal $U_{N2\_desired}$ can, as also shown in FIG. 2, be produced, for example, by means of the, as required present, power control circuit 60B of the measuring and control unit 60.

In the case of the field device electronics of the invention, it is further provided that the second useful-voltage controller $UR_2$ is fed by the useful voltage $U_{N1}$ delivered from the first useful-voltage controller $UR_1$ and/or at least by a secondary voltage $U_{N1}'$ derived from the first useful voltage $U_{N1}$. The second useful-voltage controller $UR_2$ acts, as a result, thus as a consumer supplied by the first useful-voltage controller $UR_1$ with the, in the above sense constant, internal, useful voltage $U_{N1}$.

Useful-voltage controllers $UR_1$, $UR_2$ can be, for example, so-called switching controllers, or regulators, and/or unclocked linear controllers, or regulators, while the voltage adjuster and, as a result, the input voltage controller, can be formed, for example, by means of a shunt-regulator $IS_2$ lying in a bypass to the internal input voltage $U_e$, for example one implemented by means of a transistor and/or an adjustable Zener diode.

Beyond this, the input voltage regulator is, as also shown in FIG. 5, so designed that a third, especially variable, current component $I_3$ of the supply current I flows through it, at least at times, during normal operation, with the measuring and control unit 60 delivering a second current control signal $I_3$ control appropriately controlling the voltage adjuster 30—here the shunt regulator $IS_2$—and, to such extent, also determining the third electrical current component. The current control signal $I_{3\_control}$ is, in such instance, so designed, at least for the case in which the electrical power instantaneously available in the field-device electronics 20, resulting from internal input voltage $U_e$, which is maintained essentially constant, and from the instantaneously set supply current I, exceeds the electrical power actually instantaneously needed on the part of the operating and evaluating circuit 50, that it causes a transistor provided in the input voltage controller to become conductive to a sufficient degree that a sufficiently high current component $I_3$ is caused to flow for the stabilization of the input voltage $U_e$. For this purpose, the input voltage controller (here voltage adjuster 30) has, in a further embodiment of the invention, also components, especially a semiconductor element with cooling fin, or the like, serving for the dissipation of electric energy and for getting rid of heat energy associated therewith. On the other hand, however, the current control signal $I_{3\_control}$ is also so designed that, in the case in which the need for power in the operating and evaluating circuit 50 becomes greater, it again lessens the current component $I_3$ instantaneously flowing in the voltage adjuster 30. For producing the control signal $I_{3\_control}$ actuating the voltage adjuster 30 during operation and, as a result, also at least partially regulating the division of the electrical power instantaneously available in the field device electronics, the measuring and control unit 60 additionally includes, in a further embodiment of the invention, a corresponding power control circuit 60B.

As also shown in FIG. 5, it is further provided in the field-device electronics 20 of the invention, and, to such extent, also in the field device of the invention, that the operating and evaluating circuit 50 is flowed-through, at least at times, both by a first useful current $I_{N1}$, especially such a current which is variable, driven by the first useful voltage $U_{N1}$, which is kept essentially constant, at least in normal operation, and by a second useful current $I_{N2}$, especially such a current which is variable, driven by the second useful voltage $U_{N2}$, which is allowed to vary during operation. This has the advantage that at least the assemblies and circuits of the field-device electronics 20, especially the mentioned at least one microprocessor μC, controlling the field device during normal operation and, to such extend, keeping the field device operational, can always be supplied with the electrical energy that they actually instantaneously need. Accordingly, it is provided in an embodiment of the invention, that the above-mentioned microprocessor μC and/or the mentioned signal processor are/is operated, at least partially, with first useful voltage $U_{N1}$ largely held constant during normal operation, or with a secondary voltage derived therefrom. In a further development of this embodiment of the invention, the first useful voltage $U_{N1}$, or a secondary voltage derived therefrom, serves further, at least partially, also as operating voltage for the at least one A/D-converter provided in the operating and evaluating circuit. In a further embodiment of the invention, it is provided that at least also the components of the field-device electronics controlling and maintaining the communication with the mentioned, superordinated control and review unit, thus, here, besides the microprocessor μC, also the communication circuit COM, are, at least partially, supplied by means of the first useful voltage $U_{N1}$ or by a secondary voltage derived therefrom.

Depending on which power can actually be made available during operation on the part of the external supply circuit 70 and as a function also of the actual power requirement of the consumers fed already, in the above-described manner, by the first useful voltage $U_{N1}$, also individual components of the driver unit 50B, especially such which serve for producing the driver signal $i_{exc}$, for example amplifiers, D/A-converters and/or signal generators, etc., provided therein, can, additionally, be fed, at least partially, by means of the first useful voltage $U_{N1}$ or a secondary voltage derived therefrom; compare, in this connection, also FIG. 12. However, it has been found that, alone already with currently obtainable microprocessors μC and/or A/D-converters and the peripheral circuits required therefor, one must already reckon with a permanent power requirement of about 30 mW in normal operation, so that, at least in the case of applications having a permanently available power of only about 40 mW, thus with terminal voltages of 12 V (=volt) or less, the aforementioned components of the driver unit 50B can only still be connected to the first useful voltage $U_{N1}$ to a very limited extent, without endangering the desired, high stability. To such extent, an embodiment of the invention further provides that individual components of the driver unit 50B are operated, especially for longer periods of time, only using the second useful voltage $U_{N2}$. Especially, the second useful voltage $U_{N2}$ is suitable, as also shown representatively in FIG. 12, as operating voltage for the operational amplifier provided in the driver unit 50B. Accordingly then, the exciter current $i_{exc}$ for the magnetic field coils are driven essentially by the second useful voltage $U_{N2}$ or a secondary voltage derived therefrom.

For bridging-over transient voltage fluctuations on the part of the supply voltage and/or for buffering possible short-time "overloadings" of the internal field-device voltage supply due to a momentarily higher internal power requirement, for example in the case of start-up of the measurement pickup or during writing of the mentioned, persistent memory EEPROM, a further development of the invention provides in the operating and evaluating circuit a storage circuit, especially a capacitive storage circuit, serving for the temporary storage of electric energy. The energy buffer C is shown as part of the voltage adjuster in the example of an embodiment illustrated here, so that it lies essentially permanently at the internal input voltage $U_e$. However, in order to be able to prevent, safely, a collapse of the useful voltage $U_{N1}$, at least in normal operation, it is, of course, important to make certain, at the beginning, in the design of the assemblies and circuits supplied by means of the first useful voltage $U_{N1}$, that their maximum consumed electrical power is, at most, equal to a minimum available electric power in normal operation and/or its instantaneously consumed electric power is at most equal to an instantaneously available power.

In a further embodiment of the invention, it is provided, additionally, that the second useful voltage $U_{N2}$ is controlled during operation as a function of an instantaneous voltage level of the internal input voltage $U_e$ of the field-device electronics. Alternatively or in supplementation thereto, it is provided that the second useful voltage $U_{N2}$ is controlled as a function of an instantaneous voltage level of a terminal voltage $U_K$ derived from the supply voltage and falling from the input, across the field-device electronics. It has, furthermore, been found to be advantageous, in this connection, to control the internal input voltage $U_e$ such that a voltage difference existing between this and the terminal voltage $U_K$ is held as constant as possible, for example at about 1 V, at least during normal operation. This makes it possible, among other things, to adjust the input voltage $U_e$ relatively accurately, even in the case of changing operating temperature of the current adjuster $IS_1$, or also of the total current controller, and a change of the pertinent transfer characteristic associated therewith and so, in simple manner, to achieve a very robust control of the internal input voltage $U_e$. The control can, in such case, be implemented, for example, by means of a difference amplifier provided in the mentioned measuring and control unit 60. The difference amplifier subtracts a sense voltage correspondingly derived from the internal input voltage $U_e$ from a sense voltage correspondingly derived from the terminal voltage $U_K$. Alternatively or in supplementation thereto, the second useful voltage $U_{N2}$ can also be controlled as a function of an instantaneous electrical current level of at least one of the three current components $I_1$, $I_2$, $I_3$. For example, the second useful $U_{N2}$ can be controlled as a function of the instantaneous electrical current level of the third current component $I_3$, which, taking into consideration the instantaneous input voltage $U_e$, essentially represents an excess power instantaneously present in the field-device electronics. Suitable as measured quantity, in this case, is especially also the second current control signal $I_{3\_control}$ controlling the voltage adjuster and, to such extent, also determining the third current component $I_3$.

For determining and/or monitoring an instantaneous operating state of the field-device electronics, a further development of the invention additionally provides means for comparing electric voltages falling in the field-device electronics and/or electric currents flowing in the field-device electronics with predetermined, especially adjustable, threshold values. Such means for comparing voltages and/or currents can, for example, be embodied as integral component(s) of the already mentioned, measuring and control unit of the supply circuit. In an embodiment of this further development of the invention, the means for comparing are so designed that, on the part of the field-device electronics, an alarm signal $x_{pwr\_fail}$ signaling an under-supplying of the field-device electronics is produced, at least when a subceeding, or falling beneath, of a minimum useful voltage limit value, predetermined for the second useful voltage $U_{N2}$, by the second useful voltage $U_{N2}$ and a subceeding of a minimum electrical current component limit value, predetermined for the third current component $I_3$, by the third current component $I_3$ are detected. Serving for registering the third current component $I_3$ can be e.g. a sense-resistor R3 provided in the input voltage controller 30, 60 and correspondingly flowed-through by the current component $I_3$, to yield an essentially current-proportional sense-voltage. In a further embodiment of the invention, the measuring and control unit 60 controls the voltage adjuster 30 by means of the current control signal $I_{3\_control}$, such that the third current component $I_3$ flows, especially only when the comparator comparing the second useful voltage with at least one associated reference voltage signals an exceeding by the second useful voltage $U_{N2}$ of a maximum useful voltage limit value predetermined for the second useful voltage. The means for comparing voltages and/or currents can be, for example, simple comparators, which compare, in each case, the sense voltage with an associated reference voltage, internally produced, for example, by means of the input voltage $U_e$ and being, in each case, proportional to the threshold value.

In a further embodiment of the invention, it is provided that at least parts of the internal operating and evaluating circuit 50, especially, however, the whole internal operating and evaluating circuit, is galvanically separated at least from current adjuster $IS_1$. Moreover, it can, however, be quite advantageous to maintain the internal operating and evaluating circuit 50, as directly evident from FIG. 5, galvanically separated both from the current adjuster $IS_1$ and also from the voltage adjuster 30. As a result, in this embodiment of the invention, also the, on occasion, present, microprocessor μC and/or the also, on occasion, present signal processor are, as components of the operating and evaluating circuit 50, equally galvanically separated from the current adjuster $IS_1$ and/or from the voltage adjuster 30. In another embodiment of the invention, it is further provided that the first useful-voltage controller $UR_1$ is held galvanically separated from the at least one amplifier and/or from the at least one A/D converter and/or from the at least one D/A converter. For implementing the galvanic separation between operating and evaluating circuit 50 and at least the current adjuster $IS_1$, in an advantageous further development, it is further provided that already also the second useful-voltage controller $UR_2$ is galvanically separated from the current adjuster $IS_1$ and/or from the voltage adjuster 30.

In a further embodiment of the invention, it is provided that the first useful-voltage controller $UR_1$ and the internal operating and evaluating circuit 50 are galvanically separated from one another. For example, the useful-voltage controller $UR_1$ and the internal operating and evaluating circuit 50 can, for this purpose, be coupled with one another by means of a transformer 91. Instead of the single transformer 91 shown here, it is also possible, in case required, to use two or more of such transformers for the coupling of useful-voltage controller $UR_1$ and internal operating and evaluating circuit 50. It is here recognizable for those skilled in the art and requires, as a result, no detailed explanation, that, in the case of use of transformers for the galvanically separated coupling of two electrical components operating on the basis of DC voltage, there must first on the primary side of the transformer be a conversion of the DC to AC voltage, and on the secondary side of the transformer accordingly a corresponding conversion from AC to DC voltage. Accordingly, at least for the case in which the useful voltage $U_{N1}$ to be transmitted is a DC voltage, the transformer 91 is coupled on the primary and secondary sides, respectively, to electronic components modulating the DC voltage in suitable manner and to, in turn, electronics demodulating the modulated and transmitted voltage, so that, with these components, the transformer 91 interacts as a direct voltage converter or also a DC/DC converter for the useful voltage $U_{N1}$ delivered from the first useful-voltage controller $UR_1$ situated on the primary side. The electronic components correspondingly modulating the DC voltage can be, for example, rectangular modulators acting as choppers, while, for example, passive or synchronously clocked rectifiers can serve as correspondingly demodulating electronic components.

In an advantageous further development of the invention, it is additionally provided that the two useful-voltage controllers $UR_1$, $UR_2$ are already galvanically separated from one another. For this, the transformer 91 is, as shown in FIG. 5, inserted between the two useful-voltage controllers $UR_1$, $UR_2$, so that they are coupled together, especially exclusively, by the, here, single transformer 91, optionally coupled with formation of a suitable DC converter.

As already mentioned, the second useful-voltage controller $UR_2$ is controlled during operation by the measuring and control unit 60, at least in so far as the voltage level to be set instantaneously for the second useful voltage $UN_2$ is specified by the measuring and control unit 60. For this purpose, the measuring and control unit 60 delivers during operation, at least at times, a voltage control signal $U_{N2\_desired}$ correspondingly controlling the second useful-voltage controller $UR_2$ and representing the voltage level instantaneously to be set for the second useful voltage $U_{N2}$. In a further embodiment of the invention, it is further provided in such case that the measuring and control unit 60 and the second useful-voltage controller $UR_2$ are maintained galvanically separated from one another. The measuring and control unit 60 can, in such case, as also shown schematically in FIG. 5, be coupled to the second useful-voltage controller $UR_2$, for example, by means of at least one transformer 92 connected, at least at times, into the signal path of the voltage control signal $U_{N2\_desired}$ and/or by means of at least one optocoupler connected, at least at times, into the signal path of the voltage control signal $U_{N2\_desired}$.

Additionally, it is provided in a further embodiment of the invention that the measuring and control unit 60 and the internal operating and evaluating circuit 50 are held galvanically separated from one another. The measuring and control unit 60 and the internal operating and evaluating circuit 50 can, in such case, as also shown schematically in FIG. 5, be coupled together for example, by means of at least one transformer 93 and/or by means of at least one optocoupler. As a result, in the case of this embodiment of the invention, the internal operating and evaluating circuit 50 is kept galvanically separated also from the, on occasion, present, at least one comparator for the third current component $I_3$ and/or from the, on occasion, present, at least one comparator for the second useful voltage $UN_2$. In a further development of this embodiment of the invention, for this purpose, the second useful-voltage controller $UR_2$ is already kept galvanically separated from the at least one comparator for the third current component $I_3$ and/or from the at least one comparator for the second useful voltage $UN_2$. Depending on the number of signal outputs of the operating and evaluating circuit 50 as well as of the measuring and control unit 60, which, in particular, are each to be coupled galvanically separatedly directly with a corresponding signal input of the operating and evaluating circuit 50 or the measuring and control unit 60, it can be quite necessary to provide, in addition to transformer 93, appropriately more transformers in the field device electronics. For example, the transformer 93 can serve for transmitting the alarm signal $x_{pwr\_fail}$ from the measuring and control unit 60 to the operating and evaluating circuit 50, while, as shown in FIG. 5, a corresponding transformer 94 is used for transmission of the measured value signal $x_M$.

For the above-described case, in which the field device electronics includes a communications circuit COM, a further advantageous embodiment of the invention provides that at least the communications circuit COM is maintained galvanically separated from the current adjuster $IS_1$. For this purpose, the field device electronics includes at least one further optocoupler, or, as shown in FIG. 5, at least one additional transformer 95.

Of course, in the case of the above-explained variants of the galvanic separation, it is to be understood that the transformers 92, 93, 94, 95 can each be components of suitable DC/DC converters, at least for those cases in which DC voltages/currents are transformed in this way. For the case in which clocked signals, such as e.g. digital signals, are to be transmitted via transformer or optocoupler, for example the alarm signal $x_{pwr\_fail}$, or, as shown schematically in FIG. 5, the measured value signal $x_M$ delivered from the internal operating and evaluating circuit 50 to the measuring and control unit 60, the particularly used transformers, or optocouplers, can, in case required, be supplemented with appropriate circuit components, which convert the signals to be transmitted in suitable, known manners known per se to those skilled in the art. Examples of such circuits serving for the transmission of digital signals through locations of galvanic separation are disclosed in, among others, U.S. Pat. No. 6,853,685, U.S. Pat. No. 5,952,849 and DE-A 102 51 504.

In the above-explained variants of galvanic separation, it can additionally be quite advantageous, when the, on occasion, used, at least one transformer is installed in multiplex operation in such a manner that, on the primary side, two or more circuit portions are connected, whose respective output signals are then each transmitted via this one transformer, for example displaced in time, sequentially and/or on different frequency bands. Alternatively or in supplementation thereto, the, on occasion, used, at least one transformer can also be installed in demultiplex operation such that, on the secondary side, two or more circuit portions are connected, which each selectively receive signals transmitted via this one transformer, for example clocked, displaced in time, sequentially and/or, again, on different frequency bands. Moreover, it is also possible to use one and the same transformer bidirectionally in duplex operation or half-duplex operation. Equally, additionally, also possibly used optocouplers can be installed, on occasion, unidirectionally or bidirectionally in multiplex and/or in demultiplex operation.

While the invention has been illustrated and described in detail in the drawings and forgoing description, such illustration and description is to be considered as exemplary not restrictive in character, it being understood that only exemplary embodiments have been shown and described and that all changes and modifications that come within the spirit and scope of the invention as described herein are desired to protected.

What is claimed is:

1. For a field device, a field-device electronics fed by an external, electric energy supply, said external electric energy supply providing a supply voltage and delivering a variable supply current driven thereby, and said field-device electronics comprising:
   an electric current adjuster flowed-through by the supply current for adjusting and/or modulating the supply current;
   an internal operating and evaluating circuit for controlling the field device; and
   an internal supply circuit feeding the internal operating and evaluating circuit and lying at an internal input voltage of the field-device electronics derived from the supply voltage, said internal supply circuit including
   a first useful-voltage controller flowed-through, at least at times, by a first current component of the supply current for providing in the field-device electronics a first internal, useful voltage controlled to be constant at a predeterminable, first voltage level,
   a second useful-voltage controller flowed-through, at least at times, by a second current component of the supply current for providing in the field-device electronics a second internal, useful voltage variable over a predeterminable voltage range, and a voltage adjuster, flowed-through, at least at times, by a third current component of the supply current, for adjusting and maintaining the internal input voltage of the field-device electronics at a predeterminable voltage level;

wherein the second useful-voltage controller is fed by the first useful voltage delivered by the first useful-voltage controller and/or a secondary voltage derived from the first useful voltage.

2. Field device electronics as claimed in claim 1, wherein the supply voltage supplied by said external electric energy is an unipolar one; and/or wherein the electric current adjuster clocks the supply current; and/or wherein the first useful-voltage controller and the internal operating and evaluating circuit are galvanically separated from one another; and/or wherein the first useful voltage controller and the internal operating and evaluating circuit are coupled together by means of at least one transformer; and/or wherein the two useful-voltage controllers are galvanically separated from one another; and/or wherein the two useful-voltage controllers are coupled together by means of at least one transformer; and/or wherein the current adjuster and the second useful-voltage controller are galvanically separated from one another; and/or wherein the current adjuster and the internal operating and evaluating circuit are galvanically separated from one another; and/or wherein the voltage adjuster and the second useful-voltage controller are galvanically separated from one another; and/or, wherein the voltage adjuster and the internal operating and evaluating circuit are galvanically separated from one another; and/or wherein the operating and evaluating circuit is flowed through, at least at times, both by a first useful current driven by the first useful voltage, as well as also by a second useful current driven by the second useful voltage, at least one of said first and second useful current is variable; and/or wherein the predeterminable voltage level of said internal input voltage of the field-device electronics varies during operation; and/or wherein the internal input voltage of the field device electronics is controlled as a function of an instantaneous voltage level of a terminal voltage derived from the supply voltage and dropping from the input across the field device electronics; and/or wherein the second useful voltage is controlled as a function of an instantaneous voltage level of a terminal voltage derived from the supply voltage and dropping from the input across the field device electronics.

3. Field device electronics as claimed in claim 1, wherein: the second useful voltage is controlled as a function of an instantaneous voltage level of a terminal voltage derived from the supply voltage and dropping from the input across the field device electronics, and the internal input voltage of the field device electronics is controlled as a function of the instantaneous voltage level of the terminal voltage.

4. Field device electronics as claimed in claim 1, wherein, by means of the voltage adjuster, the internal input voltage of the field device electronics is maintained at predeterminable voltage level, which is lower than the terminal voltage; and/or wherein, by means of the voltage adjuster, the internal input voltage of the field device electronics is maintained at predeterminable voltage level which is variable during operation; and/or wherein the voltage level, at which the internal input voltage is maintained, varies stepwise during operation; and/or wherein the voltage level, at which the internal input voltage is maintained, varies continuously during operation; and/or wherein the second useful voltage is controlled as a function of an instantaneous voltage level of the internal input voltage of the field device; and/or wherein the second useful voltage is controlled as a function of an instantaneous electrical current level of at least one of the three current components; and/or wherein the second useful voltage is controlled as a function of an instantaneous electrical current level of the third current component; and/or wherein the second useful voltage is controlled as a function of the instantaneous electrical current level of the second current component and an instantaneous voltage level of the internal input voltage of the field-device electronics; and/or wherein the feeding, external energy supply provides a supply voltage of variable, especially fluctuating, voltage level; and/or wherein the supply voltage delivered by the external energy supply drives a supply current of variable electrical current level fluctuating in an initially undeterminable manner; and/or wherein operating and evaluating circuit includes a storage circuit serving for temporary storage of electric energy; and/or wherein the voltage adjuster includes components serving for the dissipation of electric energy and for getting rid of concomitantly arising heat energy.

5. Field device electronics as claimed in claim 4, wherein the voltage adjuster includes semiconductor element with a cooling element serving for the dissipation of electric energy and for getting rid of concomitantly arising heat energy.

6. Field device electronics as claimed in claim 1, which field-device electronics is electrically connected with the external electric energy supply solely via a single pair of electric lines.

7. Field device electronics as claimed in claim 1, wherein there is provided in the operating and evaluating circuit at least one microprocessor, for which the first useful voltage, or a secondary voltage derived therefrom, serves, at least partially, as operating voltage.

8. Field device electronics as claimed in claim 7, wherein the first useful-voltage controller and the microprocessor are galvanically separated from one another; and/or wherein the current adjuster and the microprocessor are galvanically separated from one another; and/or wherein the voltage adjuster and the microprocessor are galvanically separated from one another.

9. Field device electronics as claimed in claim 1, wherein there is provided in the operating and evaluating circuit at least one digital signal processor, for which the first useful voltage, or a secondary voltage derived therefrom, serves, at least partially, as operating voltage.

10. Field device electronics as claimed in claim 9, wherein the first useful-voltage controller and the signal processor are galvanically separated from one another.

11. Field device electronics as claimed in claim 1,
wherein the operating and evaluating circuit comprises at least one amplifier, for which at least one of the two useful voltages, and a secondary voltage, respectively, derived therefrom, serves, at least partially, as operating voltage; and/or
wherein the operating and evaluating circuit comprises at least one A/D-converter, for which at least one of the two useful voltages, and a secondary voltage, respectively, derived therefrom, serves, at least partially, as operating voltage; and/or
wherein the operating and evaluating circuit comprises at least one D/A-converter, for which at least one of the two useful voltages, and a secondary voltage, respectively, derived therefrom, serves, at least partially, as operating voltage.

12. Field device electronics as claimed in claim 1, wherein the operating and evaluating circuit comprises at least one amplifier, for which at least one of the two useful voltages, or a secondary voltage derived therefrom, serves, at least partially, as operating voltage, said first useful-voltage controller and said at least one amplifier being galvanically separated from one another.

13. Field device electronics as claimed in claim 1, wherein the operating and evaluating circuit comprises at least one A/D-converter, for which the first useful voltage, or a secondary voltage derived therefrom, serves, at least partially, as operating voltage, said first useful-voltage controller and said at least one A/D-converter being galvanically separated from one another.

14. Field device electronics as claimed in claim 1, wherein the operating and evaluating circuit comprises at least one D/A-converter, for which at least one of the two useful voltages, and a secondary voltage, respectively, derived therefrom, serves, at least partially, as operating voltage, said first useful-voltage controller and said at least one D/A converter being galvanically separated from one another.

15. Field device electronics as claimed in claim 1, further comprising means for comparing electric voltages dropping in the field-device electronics and/or electric currents flowing in the field-device electronics.

16. Field device electronics as claimed in claim 15, further comprising:
at least one comparator, which compares a sense-voltage derived from the third electrical current component of the supply current with a reference voltage associated therewith; and/or
at least one comparator, which compares the second useful voltage with at least one reference voltage associated therewith; and/or
sense-resistors serving to produce current-proportional sense-voltages.

17. Field device electronics as claimed in claim 1, further comprising means for comparing electric voltages dropping in the field-device electronics and/or electric currents flowing in the field-device electronics, wherein:
the field-device electronics produces an alarm signal signalling the under-supplying of the field-device electronics, at least when the operating and evaluating circuit detects a subceeding by the second useful voltage of a minimum useful voltage limit value predetermined for the second useful voltage and/or a subceeding by the third electrical current component of a minimum electrical current component limit value predetermined for the third electrical current component.

18. Field device electronics as claimed in claim 1, further comprising at least one comparator, which compares a sense-voltage derived from the third electrical current component of the supply current with a reference voltage associated therewith, said at least one comparator for the third electrical current component being is galvanically separated from the second useful-voltage controller and/or from from the internal operating and evaluating circuit.

19. Field device electronics as claimed in claim 1, further comprising at least one comparator, which compares the second useful voltage with at least one reference voltage associated therewith, said at least one comparator for the second useful voltage being galvanically separated from the second useful-voltage controller and/or from the internal operating and evaluating circuit.

20. Field device electronics as claimed in claim 1, further comprising:
a measuring and control unit for registering and controlling voltages dropping in the field-device electronics and/or currents flowing in the field-device electronics; and/or
sense-resistors serving to produce current-proportional sense-voltages.

21. Field-device electronics as claimed in claim 20, wherein the measuring and control unit registers and controls at least the second useful voltage; and/or
wherein the measuring and control unit registers and controls at least one of said second and third electrical current components.

22. Field device electronics as claimed in claim 1, further comprising:
a measuring and control unit for registering and controlling voltages dropping in the field-device electronics and/or currents flowing in the field-device electronics; and at least one comparator, which compares the second useful voltage with at least one reference voltage associated therewith; wherein the measuring and control unit so controls the voltage adjuster that the third electrical current component flows, when the comparator comparing the second useful voltage with at least one associated reference voltage signals an exceeding by the second useful voltage of a maximum useful voltage limit value predetermined for the second useful voltage.

23. Field device electronics as claimed in claim 1, further comprising a measuring and control unit for registering and controlling voltages dropping in the field-device electronics and/or currents flowing in the field-device electronics; wherein the measuring and control unit:
maintains, on the basis of the input voltage and/or the terminal voltage, a voltage difference existing between the input voltage and the terminal voltage at a predetermined voltage level, and/or
controls the second useful-voltage controller.

24. Field device electronics as claimed in claim 23, wherein the measuring and control unit, on the basis of the input voltage and/or the terminal voltage, maintains a voltage difference existing between the input voltage and the terminal voltage at a predetermined voltage level equal to or greater than 1 V; and/or
wherein the second useful-voltage controller is controlled by the measuring and control unit such that the measuring and control unit delivers, at least at times, a voltage control signal controlling the second useful-voltage controller, said voltage control signal representing a voltage level instantaneously desired for the second useful voltage.

25. Field device electronics as claimed in claim 1, further comprising:
a measuring and control unit for registering and controlling voltages dropping in the field-device electronics and/or currents flowing in the field-device electronics, wherein:
the measuring and control unit and the second useful-voltage controller are galvanically separated from one another, and/or are
the measuring and control unit and the second useful-voltage controller are galvanically are coupled with one another by means of at least one transformer and/or by means of at least one optocoupler, and/or
the measuring and control unit and the internal operating and evaluating circuit are galvanically separated from one another, and/or
the measuring and control unit and the internal operating and evaluating circuit are coupled with one another by means of at least one transformer and/or by means of at least one optocoupler.

26. Field-device for measuring and/or monitoring at least one specified physical and/or chemical parameter of a medium, said field device comprising a field-device electronics as claimed in claim 1, as well as, electrically coupled with the field-device electronics, a physical-to-electrical, measurement pickup, which reacts to changes of the at least one parameter and issues, at least at times, at least one measurement signal corresponding with the parameter.

27. Field device as claimed in claim 26,
wherein the measuring and control unit, together with the current adjuster, forms a current controller and wherein the current controller controls the supply current taking into consideration the measured value instantaneously representing the at least one parameter to be measured and/or monitored; and/or
wherein the measurement pickup issues a measurement signal in the form of a variable signal voltage and/or in the form of a variable signal current; and/or
wherein, for conveying the medium, the measurement pickup includes at least one measuring tube insertable into the course of a pipeline; and/or
wherein the operating and evaluating circuit of the field-device electronics produces, at least at times, by means of the at least one measurement signal, a measured value instantaneously representing the at least one parameter to be measured and/or monitored; and/or
wherein the operating and evaluating circuit includes at least one driver circuit for the measurement pickup; and/or
wherein the operating and evaluating circuit includes at least one A/D-converter for the at least one pickup signal.

28. Field device as claimed in claim 27, wherein the measured value instantaneously representing the at least one parameter to be measured and/or monitored digitally; and/or
wherein the measuring and control unit, together with the current adjuster, forms a linear current controller; and/or
wherein the supply current is a variable, direct current and wherein the current controller is designed for modulating the measured value, at least at times, onto an amplitude of the supply current; and/or
wherein the supply current is, at least at times, a clocked current and wherein the current controller is designed to clock the supply current; and/or
wherein the operating and evaluating circuit includes a driver circuit for the measurement pickup, and the second useful voltage, or a secondary voltage derived therefrom, serves as operating voltage for the driver circuit; and/or
wherein the measurement pickup includes, for conveying the medium, at least one measuring tube insertable into the course of a pipeline, said at least one measuring tube vibrating, at least at times, during operation.

29. Field device as claimed in preceding claim 26, wherein the operating and evaluating circuit includes at least one driver circuit for the measurement pickup, and the second useful voltage, or a secondary voltage derived therefrom, serves at least partially as operating voltage for the driver circuit.

30. Field device as claimed in claim 29, wherein the driver circuit includes at least one operational amplifier; and/or
wherein the driver circuit includes at least one D/A-converter; and/or
wherein the driver circuit includes at least one signal generator, especially a digital signal generator, for producing the driver signal.

31. Field device as claimed in claim 30, wherein the measurement pickup includes an electrical impedance fed from the driver circuit.

32. Field device as claimed in claim 31, wherein the electrical impedance is variable; and/or
wherein the electrical impedance includes a magnet coil; and/or
wherein the electrical impedance includes a capacitor.

33. Field device as claimed in claim 32, wherein the electrical impedance includes a magnet coil of variable inductance; and/or
wherein the electrical impedance includes a measuring capacitor of variable capacitance;
wherein the electrical impedance of the measurement pickup changes as a function of the at least one parameter to be measured and/or monitored; and/or
wherein a signal voltage dropping across the changing electrical impedance serves as measurement signal; and/or
wherein a signal current flowing through the changing electrical impedance serves as measurement signal.

34. Field device as claimed in claim 26, wherein the operating and evaluating circuit includes at least one A/D-converter for the at least one pickup signal, and the first useful voltage, or a secondary voltage derived therefrom, serves, at least partially, as operating voltage.

35. Field device as claimed in claim 34, wherein the operating and evaluating circuit includes at least one microcomputer connected with the A/D-converter, for generating the measured value, and wherein the first useful voltage serves at least partially as an operating voltage of the microcomputer.

36. Field device as claimed in claim 26, wherein, for conveying the medium, the measurement pickup includes at least one measuring tube insertable into the course of a pipeline, and wherein at least one magnet coil is arranged at the measurement pickup for producing a magnetic field.

37. Field device as claimed in claim 36, wherein the magnetic field produced by said at least one magnet coil is variable; and/or
wherein the at least one magnet coil has flowing through it, at least at times, for generating the magnetic field, an exciter current driven by the second useful voltage, or a secondary voltage derived therefrom; and/or
wherein the at least one magnet coil interacts with a plunging armature, said magnet coil and plunging armature being movable relative to one another; and/or wherein the at least one measuring tube of the measurement pickup vibrates, at least at times, during operation of the measurement pickup, driven by an electromechanical exciter mechanism formed by means of the magnet coil and the plunging armature; and/or wherein, for conveying the medium, the measurement pickup comprises two measuring tubes vibrating, at least at times, during operation.

38. Field device as claimed in claim 37, wherein the exciter current flowing through at least one magnet coil is a bipolar exciter current, and/or a current variable in an electrical current level.

39. Field device as claimed in claim 26,
wherein the measurement pickup serves for registering at least one parameter of a container carrying the medium, and wherein the measurement pickup comprises, for such purpose, at least one measuring probe projecting into a lumen of the container or at least communicating with the lumen.

40. Field device as claimed in claim 39, wherein the measurement pickup serves for registering a fill level of a container carrying the medium; and/or
wherein the measurement pickup comprises at least one measuring probe selected from a group consisting of: microwave antenna, Goubau line, and vibrating immersion element.

41. Field device as claimed in claim 26, communicating, at least at times, via a data transmission system, with an external control and review unit situated remotely from the field device, wherein, for such, a communication circuit controlling the communication via the data transmission system is provided in the field-device electronics.

42. Field device as claimed in claim 41, wherein the first useful voltage, or a secondary voltage derived therefrom, serves, at least partially, as operating voltage for the communication circuit; and/or
wherein the current adjuster and the communication circuit are maintained galvanically separated from one another.

43. Field device as claimed in claim 26, wherein the field-device electronics is electrically connected with the external energy supply solely via a single pair of electric lines and wherein the field-device electronics transmits the measurement value produced at least at times to represent instantaneously the at least one parameter to be measured and/or monitored, via the single pair of electric lines to an evaluation circuit provided in the external electrical energy supply and/or electrically coupled therewith.

44. Field device as claimed in claim 43, wherein an instantaneous electrical current level of the supply current represents the instantaneously produced, measured value.

45. Use of the field-device as claimed in claim 26, comprising:
measuring and/or monitoring at least one specified physical and/or chemical parameter of a medium, said parameter being selected from a parameter group consisting of: flow rate, density, viscosity, fill level, pressure, temperature, and pH-value; and/or
measuring and/or monitoring at least one specified physical and/or chemical parameter of a medium conveyed in a pipeline; and/or
measuring and/or monitoring at least one specified physical and/or chemical parameter of a medium contained in a container.

46. Field device for adjusting at least one predetermined physical and/or chemical parameter of a medium, said field device comprising a field-device electronics as claimed in claim 1, as well as an electrical-to-physical actuator electrically coupled with the field-device electronics, wherein the actuator reacts to changes of at least one applied control signal with an adjusting motion of the actuator for influencing the parameter to be adjusted.

47. Field-device as claimed in claim 46, wherein the actuator reacts to changes of a variable signal voltage and/or changes of a variable signal current with an adjusting motion of the actuator for influencing the parameter to be adjusted.

48. Use of the field-device as claimed in claim 47, for adjusting at least one predetermined physical and/or chemical parameter of a medium, said parameter being selected from a parameter group consisting of: flow rate, density, viscosity, fill level, pressure, temperature, and pH-value; and/or
for adjusting at least one predetermined physical and/or chemical parameter of a medium conveyed in a pipeline; and/or
for adjusting at least one predetermined physical and/or chemical parameter of a medium contained in a container.

* * * * *